(12) United States Patent
Oda et al.

(10) Patent No.: US 7,557,349 B2
(45) Date of Patent: Jul. 7, 2009

(54) BOLOMETER-TYPE THZ-WAVE DETECTOR

(75) Inventors: Naoki Oda, Tokyo (JP); Susumu Komiyama, Tokyo (JP); Iwao Hosako, Tokyo (JP)

(73) Assignees: NEC Corporation, Tokyo (JP); The University of Tokyo, Tokyo (JP); National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 12/056,631

(22) Filed: Mar. 27, 2008

(65) Prior Publication Data

US 2008/0237469 A1  Oct. 2, 2008

(30) Foreign Application Priority Data

Mar. 27, 2007  (JP)  ............................. 2007-081828

(51) Int. Cl.
 *G01J 5/02*  (2006.01)
(52) U.S. Cl. ................ 250/341.1; 250/339.02
(58) Field of Classification Search ............. 250/341.1, 250/339.02
See application file for complete search history.

(56) References Cited

U.S. PATENT DOCUMENTS

| 6,329,655 | B1 | 12/2001 | Jack et al. |
| 6,441,368 | B1* | 8/2002 | Grinberg et al. ............ 250/239 |
| 2008/0237467 | A1* | 10/2008 | Oda et al. ................ 250/338.3 |

* cited by examiner

*Primary Examiner*—David P Porta
*Assistant Examiner*—Mark R Gaworecki
(74) *Attorney, Agent, or Firm*—Young & Thompson

(57) ABSTRACT

In a bolometer-type THz-wave detector 1 in a micro-bridge structure in which a temperature detecting portion 14 (diaphragm) including a bolometer thin film 7 is supported by a supporting portion 13 in a state suspended from a circuit substrate, a member (dielectric cover 11) made of a dielectric material for efficiently collecting a THz wave is added to an upper part of the temperature detecting portion 14, and when a refractive index of the dielectric cover 11 is n, thickness is t, and a wavelength of the THz wave is $\lambda$, a setting is made so as to have at $>\lambda$, and a gap between the dielectric cover 11 and the temperature detecting portion 14 is set at integral multiples of $\lambda/2$. By this arrangement, an absorptance of the THz wave can be improved using a structure and manufacturing method of a bolometer-type infrared detector, and a high-performance bolometer-type THz-wave detector can be manufactured with a high yield.

9 Claims, 22 Drawing Sheets

WAVELENGTH 100μm, GAP BETWEEN REFLECTIVE FILM AND TEMPERATURE DETECTING PORTION 1.5μm, SiO 5μm

WAVELENGTH 10μm, GAP BETWEEN REFLECTIVE FILM AND TEMPERATURE DETECTING PORTION 1.5μm, SiO 5μm

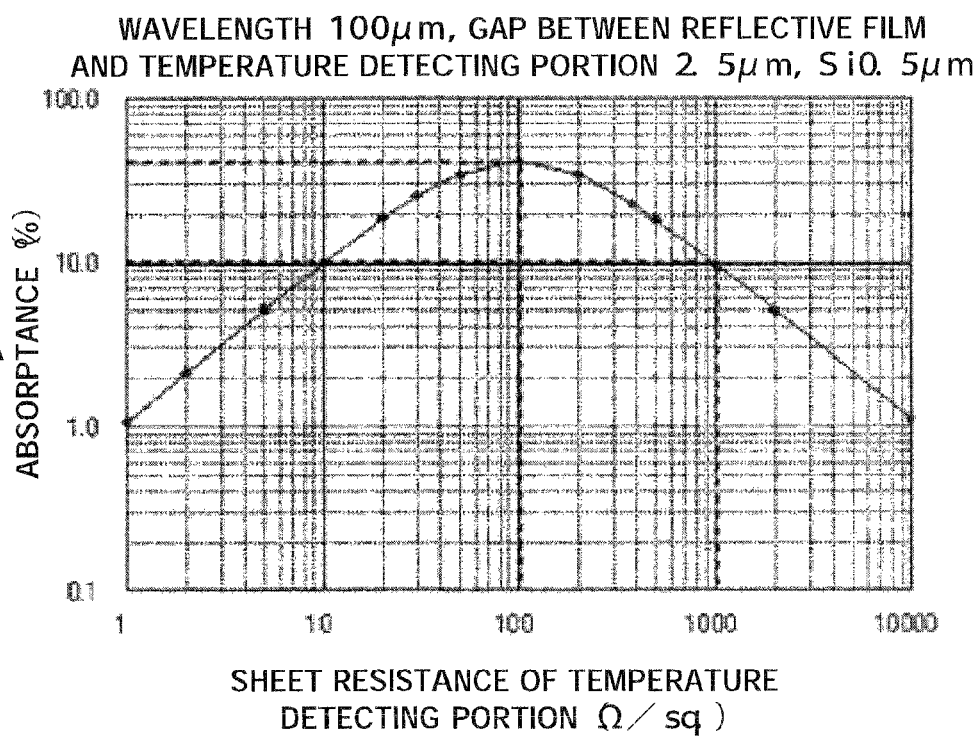
FIG. 20A  WAVELENGTH 100μm, GAP BETWEEN REFLECTIVE FILM AND TEMPERATURE DETECTING PORTION 2.5μm, SiO 5μm
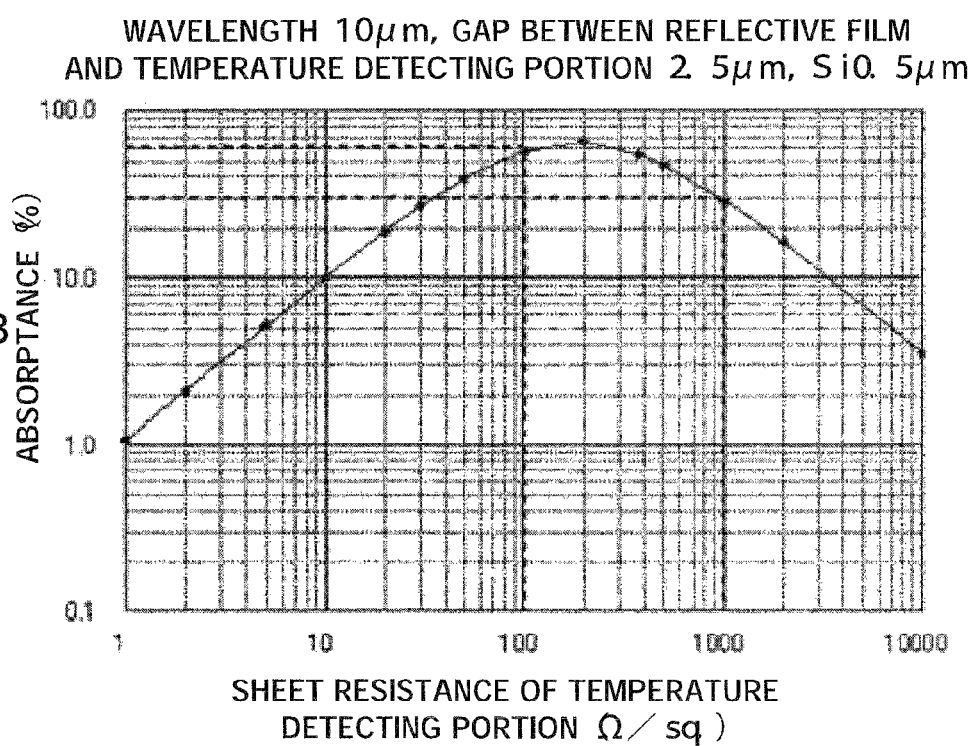
FIG. 20B  WAVELENGTH 10μm, GAP BETWEEN REFLECTIVE FILM AND TEMPERATURE DETECTING PORTION 2.5μm, SiO 5μm ately 30 μm to 1 mm, hereinafter referred to as# BOLOMETER-TYPE THZ-WAVE DETECTOR

BACKGROUND OF THE INVENTION

1. Field of the Invention

The present invention relates to a detector for detecting an electromagnetic wave (THz-wave) in a THz-frequency band and more particularly to a bolometer-type THz-wave detector.

2. Description of the Related Art

Recently, an electromagnetic wave in a terahertz frequency band between light and an electric wave (that is, an electromagnetic wave with a frequency of $10^{12}$ Hz and a wavelength of approximately 30 μm to 1 mm, hereinafter referred to as THz-wave) has drawn attention as the electromagnetic wave directly reflecting information of a substance. A detector for detecting the THz wave (hereinafter referred to as a THz-wave detector) is generally in a structure comprising an antenna portion such as a dipole antenna or a Bow-tie antenna capturing the THz wave and an electric signal conversion portion for converting the THz wave captured by the antenna portion into an electric signal. As methods of converting the electromagnetic wave into the electric signal, Capacitive coupling type, Resistive coupling type and the like are known.

U.S. Pat. No. 6,329,655 discloses, for example, a Capacitive-coupling type THz-wave detector as shown in FIGS. 21A and 21B. This THz-wave detector is in a structure in which a glass layer 31 is formed on a substrate 30, four metal antennas 32 (Bow-tie antennas) are formed on the glass layer 31, and a detecting element 37 in which a heater film 33, an insulator 34, a thermal resistance layer 35, and an insulator 36 are laminated, is formed at the center part of the four metal antennas 32, with a predetermined gap (GAP 1 and GAP 2) from the glass layer 31 and the metal antennas 32.

U.S. Pat. No. 6,329,655 also discloses a Resistive-coupling type THz-wave detector as shown in FIGS. 22A and 22B. This THz-wave detector is in a structure in which the glass layer 31 is formed on the substrate 30, the four metal antennas 32 (Bow-tie antennas) are formed on the glass layer 31, and the heater film 33 connected to the four metal antennas 32 is formed at a distance of a predetermined gap (GAP 3) from the glass layer 31, and the detecting element 37, in which the insulator 34, the thermal resistance layer 35, and the insulator 36 are laminated on the heater film 33, is formed. In the structure of the Resistive-coupling type THz-wave detector, a leg 38 with an impedance matched to 50 to 100Ω is needed in order to effectively transmit energy collected by the metal antennas 32 to the heater film 33, and heat conductance becomes large. Therefore, it is described that sensitivity of the Resistive-coupling type THz-wave detector is lower by one order of magnitude than that of the Capacitive-coupling type THz-wave detector.

In the case of detection of a THz wave by the Capacitive-coupling type THz-wave detector, efficient transmission of energy collected by the metal antennas 32 to the heater film 33 is required. For that purpose, a gap between the glass layer 31 and the detecting element 37 (GAP 1) and a gap between the metal antenna 32 and the detecting element 37 (GAP 2) should be controlled accurately. The above U.S. Pat. No. 6,329,655 describes that a scope of 0.1 to 1 μm is preferable as the value of GAP 2. However, if the detecting element 37 is to be suspended from the glass layer 31 by the leg 38 using the MEMS (Micro-Electro-Mechanical Systems) technology, it is difficult to set the gap within the range of 0.1 to 1 μm, and there is a problem that yield is lowered.

In the case of detection of the THz wave by the Resistive-coupling type THz-wave detector, efficient transmission of the energy collected by the metal antennas 32 to the heater film 33 is also required. For that purpose, the gap between the glass layer 31 and the heater film 33 (GAP 3) should be controlled accurately. The above U.S. Pat. No. 6,329,655 describes that a scope of 0.2 to 1 μm is preferable as the value of GAP 3. However, if the heater film 33 is to be suspended from the glass layer 31 using the MEMS technology, it is difficult to set the gap within the range of 0.2 to 1 μm, and there is a problem that yield is lowered.

It is also known that an effective aperture that can capture the electromagnetic wave by the antenna, becomes an aperture merely of a circle with a radius of merely a half wavelength at the most. It is necessary to increase the size of the metal antenna 32 to efficiently capture the THz wave, but if the THz-wave detector in the above structure is made into a two-dimensional array, the size of each detector is limited. Therefore, the size of the detecting element 37 inevitably becomes small. For example, with the THz wave with the wavelength of 1 mm, the size of the detecting element 37 is approximately several μm. It is extremely difficult to incorporate the detecting element 37 in such a small region of several μm, and there is a problem that the yield is further deteriorated.

SUMMARY OF THE INVENTION

The present invention was made in view of the above problems and has a major objective to provide a bolometer-type THz-wave detector which has high performance and can be manufactured with a high yield.

In order to achieve the above objective, the present invention comprises a substrate provided with a read-out integrated circuit, a temperature detecting portion provided with a bolometer thin film, a supporting portion arranged on the substrate and supporting the temperature detecting portion so that one face of the temperature detecting portion and the substrate are opposed to each other with a predetermined gap, a dielectric member opposed to the other face of the temperature detecting portion with a predetermined gap and having a product of refractive index and thickness larger than a wavelength of the THz wave and the gap from the temperature detecting portion set at integral multiples of a half wavelength of the THz wave, and electrode wiring connecting the read-out integrated circuit and the bolometer thin film.

In the present invention, the bolometer-type THz-wave detector is a two-dimensional array detector in which a plurality of pixels are arranged and may be configured so that the plurality of pixels are covered by the dielectric member and at least a part of the dielectric member is fixed to the substrate.

In the present invention, the dielectric member may be brought into close contact with the substrate around the plurality of pixels over the entire circumference and inside of the dielectric member containing the pixels is in a vacuum or pressure reduction state.

In the present invention, an absorbing film constituting the temperature detecting portion and absorbing the THz wave and a reflective film formed on a face of the substrate opposed to the temperature detecting portion and reflecting the THz wave and forming an optical resonance structure, together with the temperature detecting portion may be further provided, in which a gap between the reflective film and the temperature detecting portion is set on the basis of a wavelength of an infrared ray and sheet resistance of the temperature detecting portion is set on the basis of the THz wave.

In the present invention, an absorbing film constituting the temperature detecting portion and absorbing the THz wave, a reflective film formed on a face of the substrate opposed to the temperature detecting portion and reflecting the THz wave and forming an optical resonance structure together with the temperature detecting portion, and an optical film having a predetermined refractive index transmitting the THz wave between the reflective film and the temperature detecting portion may be further provided, in which a gap between the reflective film and the temperature detecting portion is set on the basis of a wavelength of an infrared ray and sheet resistance of the temperature detecting portion is set on the basis of the THz wave.

In the present invention, the optical film may comprise any one of a silicon oxide film, a silicon nitride film, a silicon oxynitride film or a silicon film.

In the present invention, a canopy extending outward from a peripheral portion of the temperature detecting portion may be further provided and the absorbing film may be formed on the canopy.

In the present invention, a gap between the reflective film and the temperature detecting portion is set within a range of 1.5 to 2.5 µm, and the sheet resistance of the temperature detecting portion may be set on the basis of correlation between the sheet resistance of the temperature detecting portion and an absorptance of the THz wave.

In the present invention, the sheet resistance of the temperature detecting portion may be set in a range in which the absorptance of said THz wave becomes 10% or more.

In the present invention, the sheet resistance of the temperature detecting portion may be set in a range of 10 to 100 Ω/square.

ADVANTAGE OF THE INVENTION

According to the present invention, a high-performance bolometer-type THz-wave detector can be manufactured with a high yield.

BRIEF DESCRIPTION OF THE DRAWINGS

FIG. 20A is a diagram illustrating correlation between sheet resistance of a temperature detecting portion and an absorptance of a THz wave with a wavelength of 100 μm of the bolometer-type THz-wave detector according to the fourth embodiment of the present invention (when a gap between a reflective film and the temperature detecting portion is 2.5 μm).

FIG. 20B is a diagram illustrating correlation between sheet resistance of a temperature detecting portion and an absorptance of an infrared ray with a wavelength of 10 μm of the bolometer-type THz-wave detector according to the fourth embodiment of the present invention (when a gap between a reflective film and the temperature detecting portion is 2.5 μm).

DETAILED DESCRIPTION OF THE PREFERRED EMBODIMENT

Figure 1:
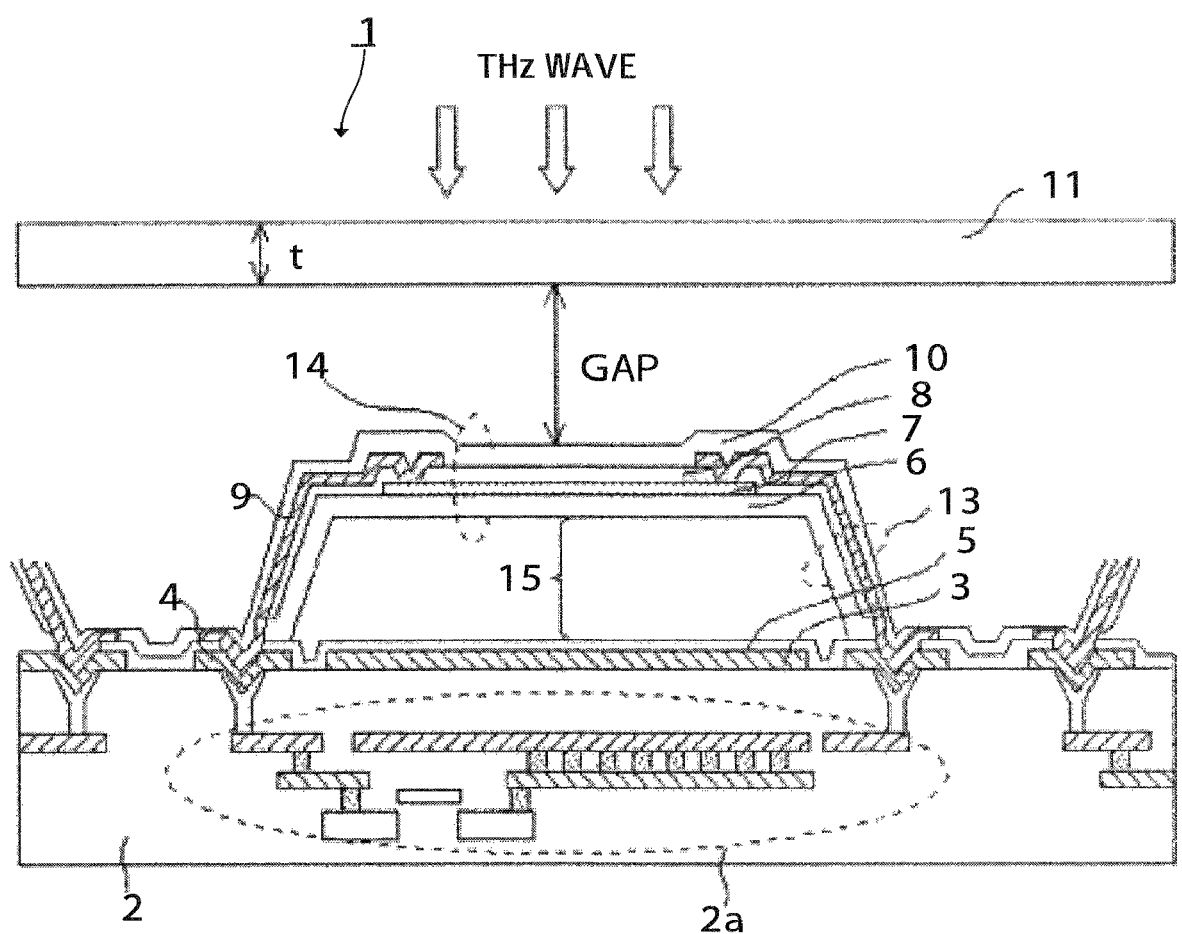
FIG. 1 is a sectional view schematically illustrating a structure of a bolometer-type THz-wave detector according to a first embodiment of the present invention.

As shown in the related art, THz-wave detectors in the Capacitive coupling type and Resistive coupling type are known as the THz-wave detector for detecting a THz wave with a frequency of $10^{12}$ Hz and a wavelength of approximately 30 μm to 1 mm. However, with the THz-wave detectors in these methods, a gap between members needs to be controlled with high accuracy of approximately 0.1 μm, and it is also necessary to incorporate a detecting element 37 in a small region of several μm, which causes a problem that manufacture of a high-performance THz-wave detector with a high yield is difficult.

On the other hand, a bolometer-type infrared detector for detecting an infrared ray with a wavelength of approximately 8 to 12 μm is known. A manufacturing method of the bolometer-type infrared detector is as follows. First, on a substrate in which a read-out integrated circuit is formed inside and a reflective film is formed on a top surface, a sacrifice layer is formed. Then, on an top surface of the sacrifice layer, a temperature detecting portion including a bolometer thin film and a protective film sandwiching the bolometer thin film is formed, and two supporting portions including electrode wiring on a side face of the sacrifice face, having one end connected to the bolometer thin film and the other end connected to the read-out integrated circuit are formed. Lastly, the sacrifice layer is removed by etching and a bolometer-type infrared detector is manufactured. The bolometer-type infrared detector thus manufactured absorbs incident infrared more efficiently by optical resonance structure (so-called optical resonator) comprising the reflective film and the temperature detecting portion formed on the substrate. The bolometer-type infrared detector obtains an infrared image by reading out resistance change of the bolometer thin film caused by absorbed infrared at the read-out integrated circuit.

While the conventional THz-wave detector captures the THz wave by an antenna, the infrared detector absorbs the infrared by the optical resonance structure. Thus, the both are totally different from each other in a method to take in an electromagnetic wave. However, the THz-wave detector supports the detecting element by the leg, while the infrared detector supports the temperature detecting portion by the supporting portion, which is a common point in their structures. Then, the inventor of the present application proposes a THz-wave detector for detecting a THz wave using the optical resonance structure used in the above bolometer-type infrared detector.

At that time, the bolometer-type infrared detector is configured to efficiently absorb the infrared ray by the optical resonance structure. However, since the temperature detecting portion easily transmits the THz wave, the absorptance of the THz wave is only several % of the absorptance of the infrared. Thus, the bolometer-type infrared detector can not have sufficient performance as the THz-wave detector.

Then, in the present invention, a THz-wave detector, which can detect a THz wave using a structure and manufacturing method of the bolometer-type infrared detector, is provided. For that purpose, a member (dielectric cover) made of a dielectric material for efficiently collecting the THz wave is added to an upper part of the temperature detecting portion. When the refractive index of this dielectric cover is n, the thickness is t, and the wavelength of the THz wave is λ, it is set to be nt>λ. Moreover, a gap between the dielectric cover and the temperature detecting portion is set at integral multiples of λ/2. By this arrangement, a THz-wave detector with improved THz-wave absorptance can be provided using the structure and manufacturing method of the bolometer-type THz-wave detector, and a high-performance THz-wave detector can be manufactured with a high yield.

EXAMPLE 1

In order to describe the above embodiment in more detail, a bolometer-type THz-wave detector according to the first embodiment of the present invention will be described referring to FIGS. 1 to 7D.

As shown in FIG. 1, a bolometer-type THz-wave detector 1 of this embodiment has, on a circuit substrate 2 on which a read-out integrated circuit 2a and the like are formed, a reflective film 3 reflecting an incident THz wave and a contact 4 connected to the read-out integrated circuit 2a are formed, and on top of that, a first protective film 5 is formed. On the contact 4, a supporting portion 13 comprising a second protective film 6, a third protective film 8, an electrode wiring 9, and a fourth protective film 10 is formed. The electrode wiring 9 is connected to the read-out integrated circuit 2a through the contact 4. By the supporting portion 13, a temperature detecting portion 14 (diaphragm) comprising the second protective film 6, a bolometer thin film 7, the third protective film 8, and the fourth protective film 10 is held in the air. The both ends of the bolometer thin film 7 are connected to the electrode wiring 9.

As mentioned above, the temperature detecting portion 14 easily transmits the THz wave. Thus, in this embodiment, a dielectric material (hereinafter referred to as a dielectric cover 11) having a product of a refractive index n and a thickness t (that is, a optical path length) larger than the wavelength of the THz wave is arranged at an upper part of the temperature detecting portion 14. This dielectric cover 11 is constructed by a silica glass, HRFZ (High Resistivity Float Zone) silicon, sapphire, artificial diamond and the like.

By arranging the dielectric cover 11 as above, on a back side (outgoing face of the THz wave) of the dielectric cover 11, an electric field of an incident wave propagated through the dielectric cover 11 and a reflective wave reflected on the back side reinforce each other in the same sign, and the THz wave can be efficiently collected on the back side ($n^3$ times).

Also, by setting the gap between the dielectric cover 11 and the temperature detecting portion 14 (GAP in FIG. 1, in more detail, a gap between the back side of the dielectric cover 11 and the center in the thickness direction of the temperature detecting portion 14) at integral multiples of the half wavelength of the THz wave, the THz wave present in a space held between the back side of the dielectric cover 11 and the reflective film 3 can be reinforced by the optical resonance. As a result, the THz wave can be efficiently absorbed by the temperature detecting portion 14.

Figure 7A:
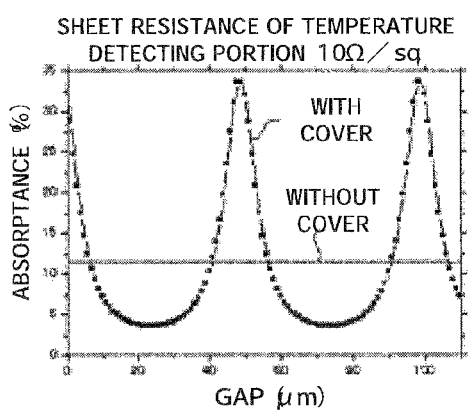
FIG. 7A is a diagram illustrating correlation between a gap between a dielectric cover and a temperature detecting portion and an absorptance of a THz wave with a wavelength of 100 µm of the bolometer-type THz-wave detector according to the first embodiment of the present invention (when the sheet resistance of the temperature detecting portion is 10 Ω/sq. and a gap between the reflective film and the temperature detecting portion is 1.5 µm).
Figure 7C:
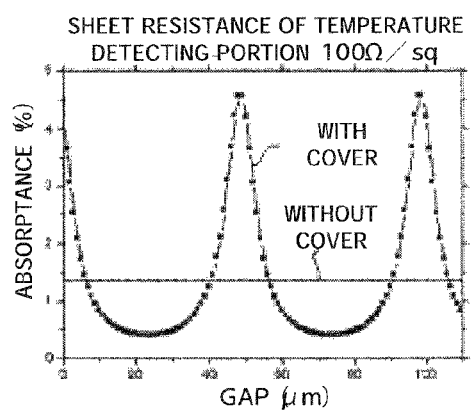
FIG. 7C is a diagram illustrating correlation between a gap between a dielectric cover and a temperature detecting portion and an absorptance of a THz wave with a wavelength of 100 µm of the bolometer-type THz-wave detector according to the first embodiment of the present invention (when the sheet resistance of the temperature detecting portion is 100 Ω/sq. and a gap between the reflective film and the temperature detecting portion is 1.5 µm).
Figure 7B:
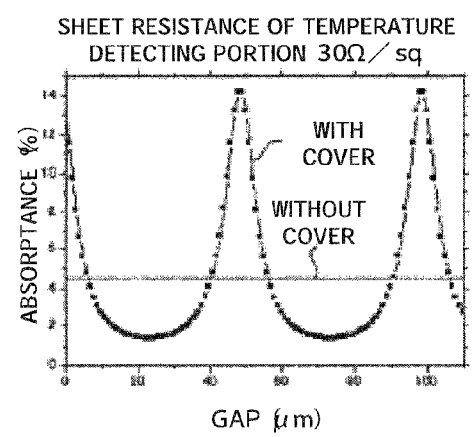
FIG. 7B is a diagram illustrating correlation between a gap between a dielectric cover and a temperature detecting portion and an absorptance of a THz wave with a wavelength of 100 µm of the bolometer-type THz-wave detector according to the first embodiment of the present invention (when the sheet resistance of the temperature detecting portion is 30 Ω/sq. and a gap between the reflective film and the temperature detecting portion is 1.5 µm).
Figure 7D:
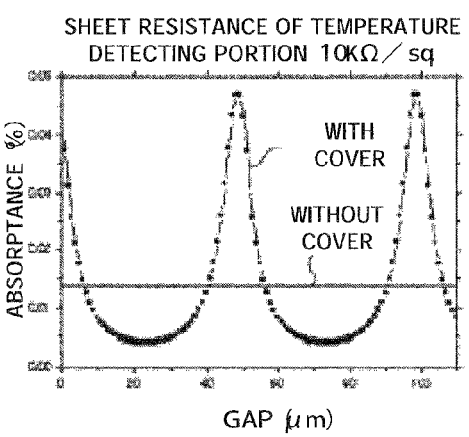
FIG. 7D is a diagram illustrating correlation between a gap between a dielectric cover and a temperature detecting portion and an absorptance of a THz wave with a wavelength of 100 µm of the bolometer-type THz-wave detector according to the first embodiment of the present invention (when the sheet resistance of the temperature detecting portion is 10 KΩ/sq. and a gap between the reflective film and the temperature detecting portion is 1.5 µm).

In order to reconfirm the above effect, in a case where the gap between the reflective film 3 and the temperature detecting portion 14 is 1.5 µm, correlation between gap between the dielectric cover 11 and the temperature detecting portion 14 (GAP) and the absorptance of the THz wave with the wavelength of 100 µm is examined when the sheet resistance of the temperature detecting portion 14 is changed. From FIG. 7A, it is known that when the sheet resistance of the temperature detecting portion 14 is 10 Ω/sq., the absorptance without the dielectric cover 11 is approximately 12%, but the absorptance with the dielectric cover 11 is increased to approximately 34% if the GAP is set at integral multiples of 50 µm. Similarly, as shown in FIG. 7B, when the sheet resistance is 30 Ω/sq., the absorptance without the dielectric cover 11 is approximately 4.4%, but the absorptance with the dielectric cover 11 is increased to approximately 14%. Also, as shown in FIG. 7C, it is known that when the sheet resistance is 100 Ω/sq., the absorptance without the dielectric cover 11 is approximately 1.4%, but the absorptance with the dielectric cover 11 is increased to approximately 4.6%. Moreover, as shown in FIG. 7D, it is known that when the sheet resistance is 10 kΩ/sq., the absorptance without the dielectric cover 11 is approximately 0.014%, but the absorptance with the dielectric cover 11 is increased to approximately 0.046%.

From the above results, by arranging the dielectric cover 11 on the temperature detecting portion 14, by setting the product of the refractive index and thickness of the dielectric cover 11 larger than the wavelength of the THz wave, and by setting the gap between the dielectric cover 11 and the temperature detecting portion 14 at integral multiples of the half wavelength of the THz wave, the absorptance of the THz wave is improved approximately by 3 times.

The dielectric cover 11 may be formed by a single member or may be in a laminated structure in which a plurality of members with different refractive indexes are laminated. Also, on the front face, back side or both of them of the dielectric cover 11, an AR (Anti Reflection) film such as a silicon oxide film and an organic film may be formed. Moreover, in order to reduce an interference effect on the front face and back side of the dielectric cover 11, it may be in the shape with one face inclined with respect to the other face by a predetermined angle (so-called wedge shape).

A manufacturing method of the bolometer-type THz-wave detector 1 with the above structure will be described below referring to FIGS. 2 to 6.

Figure 2:
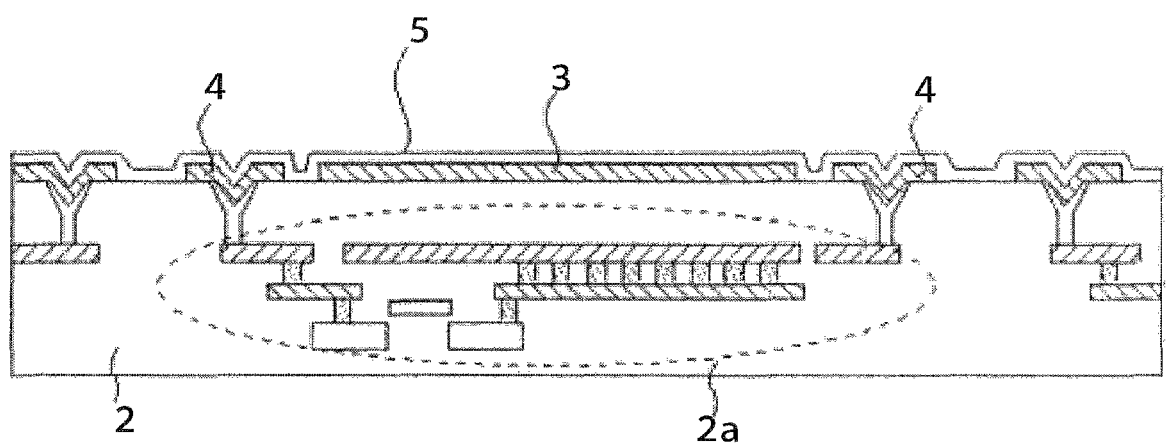
FIG. 2 is a sectional view illustrating a manufacturing method of the bolometer-type THz-wave detector according to the first embodiment of the present invention.

First, as shown in FIG. 2, on the circuit substrate 2 on which the read-out integrated circuit 2a such as a CMOS circuit is formed, a film is formed by metal such as Al, Ti and the like with the film thickness of approximately 500 nm by the sputtering method, and a pattern is formed with a resist as a mask. By this arrangement, the reflective film 3 for reflecting the THz wave incident to the temperature detecting portion 14 of each pixel and the contact 4 for connecting the electrode wiring 9 and the read-out integrated circuit 2a are formed on the circuit substrate 2. It is only necessary that the above metal is a material with high THz-wave reflectivity and small electric resistance and is not limited to Al, Ti.

Next, on the whole face of the circuit substrate 2, a silicon oxide film (SiO, $SiO_2$), a silicon nitride film (SiN, $Si_3N_4$), a silicon oxynitride film (SiON) or the like is formed with the film thickness of approximately 100 to 500 nm by the plasma CVD method, and the first protective film 5 for protecting the reflective film 3 and the contact 4 is formed.

Figure 3:
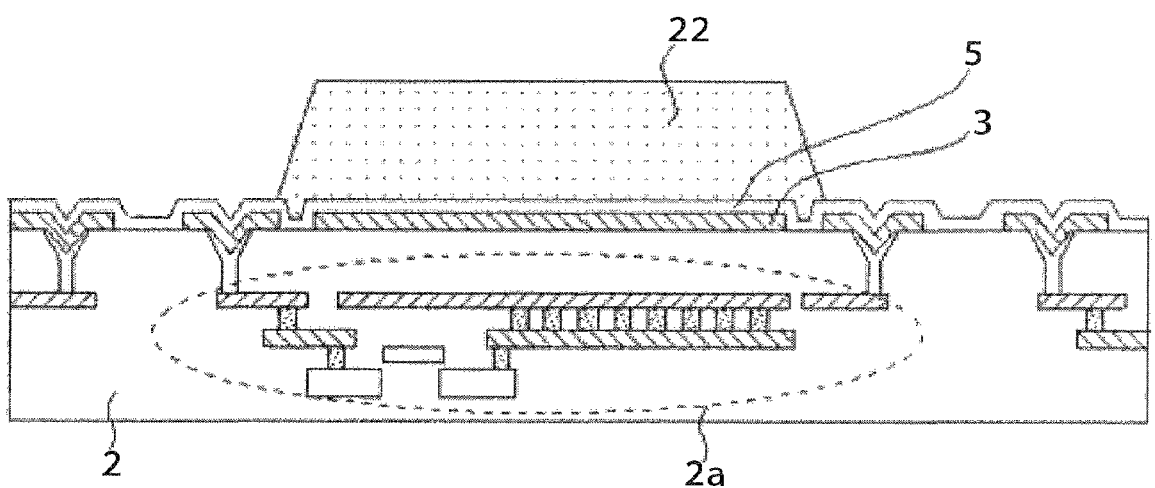
FIG. 3 is a sectional view illustrating the manufacturing method of the bolometer-type THz-wave detector according to the first embodiment of the present invention.

Next, as shown in FIG. 3, an organic film such as a photosensitive polyimide film is applied on the whole face of the circuit substrate 2 and that is exposed and developed so that the contact 4 and a region between the pixels are exposed. After that, baking is conducted at a temperature of approximately 400° C., and a sacrifice layer 22 for forming a microbridge structure is formed. At that time, the photo-sensitive polyimide film after being cured is set so that the gap between the reflective film 3 and the temperature detecting portion 14 (in more detail, the gap between the surface of the reflective film 3 and center in the thickness direction of the temperature detecting portion 14) is approximately ¼ of the wavelength of the infrared ray (1.5 to 2.5 µm, for example).

Figure 4:
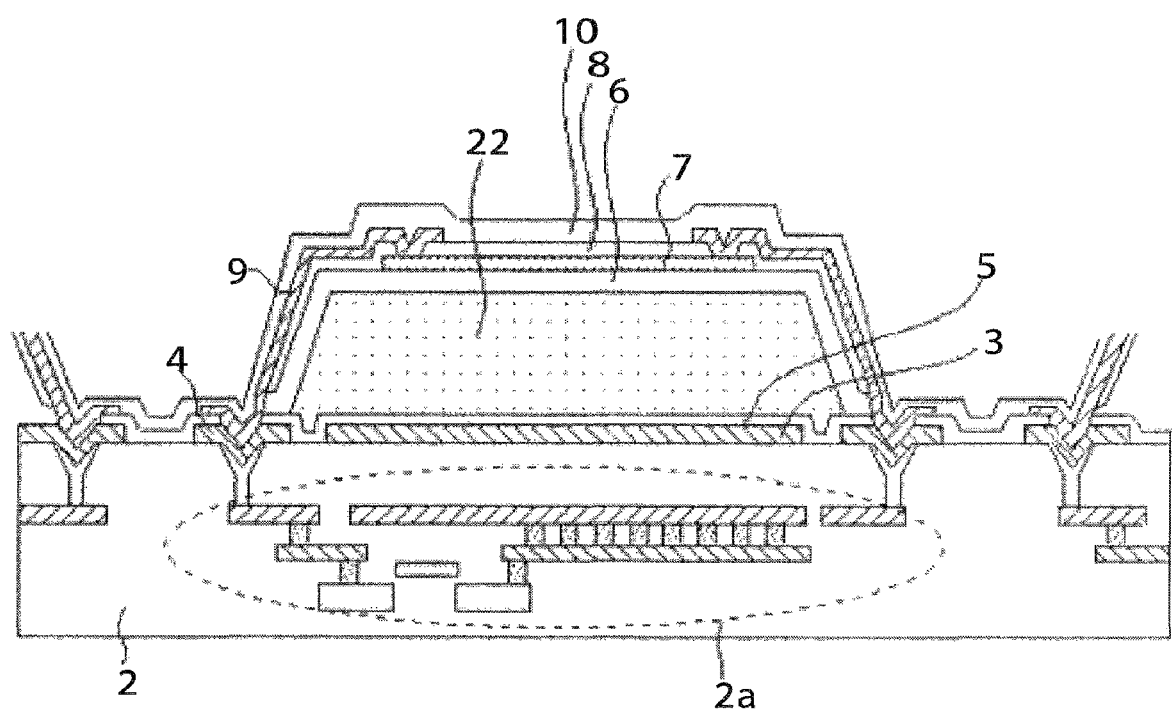
FIG. 4 is a sectional view illustrating the manufacturing method of the bolometer-type THz-wave detector according to the first embodiment of the present invention.

Next, as shown in FIG. 4, on the sacrifice layer 22, the silicon oxide film (SiO, $SiO_2$), the silicon nitride film (SiN, $Si_3N_4$), the silicon oxynitride film (SiON) or the like with the film thickness of approximately 100 to 500 nm is formed by the plasma CVD method, and the second protective film 6 is formed.

Next, on the second protective film 6, vanadium oxide ($V_2O_3$, $VO_x$ and the like) and titanium oxide ($TiO_x$) is deposited with the film thickness of approximately 50 to 200 nm by reactive sputter in an oxygen atmosphere, and a pattern is formed with the resist as the mask. By this arrangement, the bolometer thin film 7 is formed in a region to be the temperature detecting portion 14. Vanadium oxide or titanium oxide is used as the bolometer thin film 7 here, but another material with a large TCR (Temperature Coefficient Resistance) may be used.

Next, the silicon oxide film (SiO, $SiO_2$), the silicon nitride film (SiN, $Si_3N_4$), the silicon oxynitride film (SiON) or the like with the film thickness of approximately 50 to 200 nm is formed by the plasma CVD method so as to form the third protective film 8 protecting the bolometer thin film 7. After that, the first protective film 5, the second protective film 6 and the third protective film 8 on the contact 4 and the third protective film 8 at the end portion of the bolometer thin film 7 are removed.

Next, a film of metal such as Al, Cu, Au, Ti, W, Mo and the like is formed with the film thickness of approximately 50 to 200 nm is formed by the sputtering method and then, a pattern is formed with the resist as the mask, and the electrode wiring 9 is formed. The electrode wiring 9 electrically connects the bolometer thin film 7 and the read-out integrated circuit 2a in the circuit substrate 2 through the contact 4 and also plays a role as the supporting portion 13 holding the bolometer thin film 7 in the air.

Next, the silicon oxide film (SiO, $SiO_2$), the silicon nitride film (SiN, $Si_3N_4$), the silicon oxynitride film (SiON) or the like with the film thickness of approximately 100 to 500 nm is formed by the plasma CVD method so as to form the fourth protective film 10 protecting the electrode wiring 9. After that, by the plasma etching using a mixed gas of methane monofluoride and oxygen, etching is applied to a predetermined region of the second protective film 6, the third protective film 8, and the fourth protective film 10. By this arrangement, a through hole is formed in a predetermined region on the sacrifice layer 22 so as to partially expose polyimide. Next, by ashing using $O_2$ gas plasma, the sacrifice layer 22 is removed. By this arrangement, the pixels in the micro-bridge structure in which the temperature detecting portion 14 is held by the supporting portion 13 in a state suspended from the circuit substrate 2.

The sacrifice layer 22 may be constituted by polysilicon or Al. When polysilicon is used, the sacrifice layer 22 can be removed by wet etching using hydrazine or tetramethylammonium hydroxide (TMAH), for example, or dry etching using $XeF_2$ plasma or the like. When Al is used, the sacrifice layer 22 can be removed by the wet etching using hydrochloric acid or hot phosphoric acid, for example.

When the silicon oxide film is used for the second protective film 6, the third protective film 8, and the fourth protective film 10, the sacrifice layer 22 may be constituted by a silicon nitride film, and moreover, vice versa. When the silicon nitride film is used as the sacrifice layer 22, it can be removed by the wet etching using hot phosphoric acid, for example. If the silicon oxide film is used as the sacrifice layer 22, it can be removed by the wet etching using hydrofluoric acid, for example.

Figure 5:
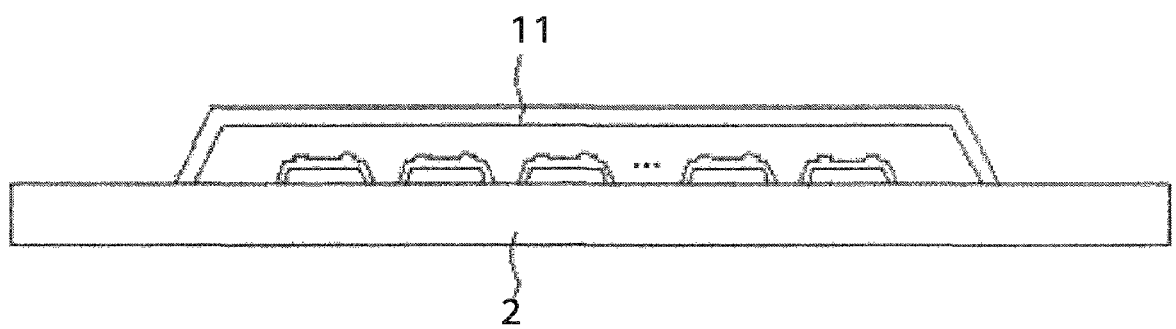
FIG. 5 is a sectional view illustrating the manufacturing method of the bolometer-type THz-wave detector according to the first embodiment of the present invention.

Next, as shown in FIG. 5, a dielectric material such as fused silica, HRFZ silicon, sapphire, artificial diamond and the like is machined into a lid state with a substantially flat upper part so that a product of a refractive index and a thickness is larger than a wavelength of the THz wave (100 μm, in this case) so as to form a dielectric cover 11. Then, the dielectric cover 11 is placed to cover the plurality of pixels so that a gap from the temperature detecting portion 14 becomes integral multiples of a half wavelength of the THz wave (50 μm, in this case) and fixed to a circuit substrate 2 by at least partial adhesion, brazing or fitting.

Since the gap between the dielectric cover 11 and the temperature detecting portion 14 is remarkably larger than a gap between a reflective film 3 and the temperature detecting portion 14, slight displacement of the gap hardly affects sensitivity. Also, it is only necessary for the dielectric cover 11 to satisfy the above conditions on an upper part of the temperature detecting portion 14 of each pixel, and the shape is not limited to configuration in FIG. 5. For example, a side portion of the lid may be perpendicular to a circuit substrate face or may be rounded in the shape or moreover, the thickness of a side portion may be large. Also, the structure may be such that the dielectric cover 11 is machined into a plate state and a frame formed by an arbitrary member is arranged around the plurality of pixels, with the dielectric cover 11 fixed onto the frame. In FIG. 5, a single dielectric cover 11 covers all the pixels in the structure, but if a gap between the pixels is large, the dielectric cover 11 may be arranged at each pixel or each group of the predetermined number of pixels.

Figure 6:
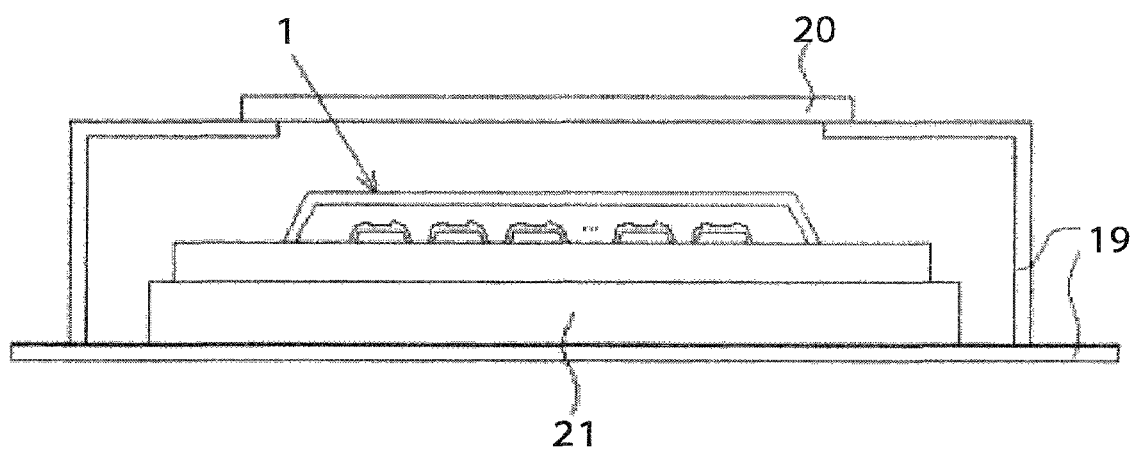
FIG. 6 is a sectional view illustrating the manufacturing method of the bolometer-type THz-wave detector according to the first embodiment of the present invention.

Also, it may be so constructed that the dielectric cover 11 is made into an air-tight structure and the inside of the dielectric cover 11 is reduced into a vacuum or a low pressure so that an external influence hardly affects. In that case, there is a possibility that the dielectric cover 11 is pressed from the periphery and flexed. Thus, in order that a force is not applied onto the dielectric cover 11, first, as shown in FIG. 6, the pixels covered by the dielectric cover 11 is loaded on a temperature stabilizer 21 such as a Peltier device. Then, they are sealed by a vacuum package 19 and a window 20 or the like made of a material that transmits the THz wave, and the inside pressure is vacuumed or reduced.

As mentioned above, in this embodiment, using a structure and a manufacturing method of the bolometer-type infrared detector, the dielectric cover 11 is arranged above the temperature detecting portion 14, and setting is made so that a product of the refractive index and the thickness of the dielectric cover 11 becomes larger than the wavelength of the THz wave, and also, the gap between the dielectric cover 11 and the temperature detecting portion 14 becomes integral multiples of a half wavelength of the THz wave. By this arrangement, an absorptance of the THz wave can be outstandingly improved, and a high-performance bolometer-type THz-wave detector 1 can be manufactured with a good yield.

EXAMPLE 2

Next, the bolometer-type THz-wave detector according to a second embodiment of the present invention will be described referring to FIGS. 8 to 11B.

In the above-mentioned first embodiment, the dielectric cover 11 is arranged above the temperature detecting portion 14 so that the THz wave can be efficiently absorbed between the dielectric cover 11 and the temperature detecting portion 14. However, the gap in the optical resonance structure constituted by the temperature detecting portion 14 and the reflective film 3 is set on the basis of the wavelength of the infrared ray, and a sheet resistance of the temperature detecting portion 14 is approximately several hundreds to several thousands Ω/sq. Under this condition, the bolometer-type THz wave detector can not efficiently absorb the THz wave having transmitted the temperature detecting portion 14.

Methods to improve the absorptance of the THz wave of the bolometer-type infrared detector include a method of setting a gap between the reflective film and the temperature detecting portion on the basis of the THz wave. In this case, a sacrifice layer should be formed with a thickness of ¼ of the wavelength of the THz wave, that is, approximately several tens to several hundreds am, and it is difficult to form a temperature detecting portion or a supporting portion on the sacrifice layer with such a large film thickness. Even if the temperature detecting portion and the supporting portion can be formed, removal of the sacrifice layer by etching becomes difficult, which remarkably lowers yield. Moreover, in a structure in which the temperature detecting portion is supported at a height of several tens to several hundreds μm from the substrate, the shape is subject to deformation due to vibration or impact, which makes maintenance of high performance difficult.

Figure 8:
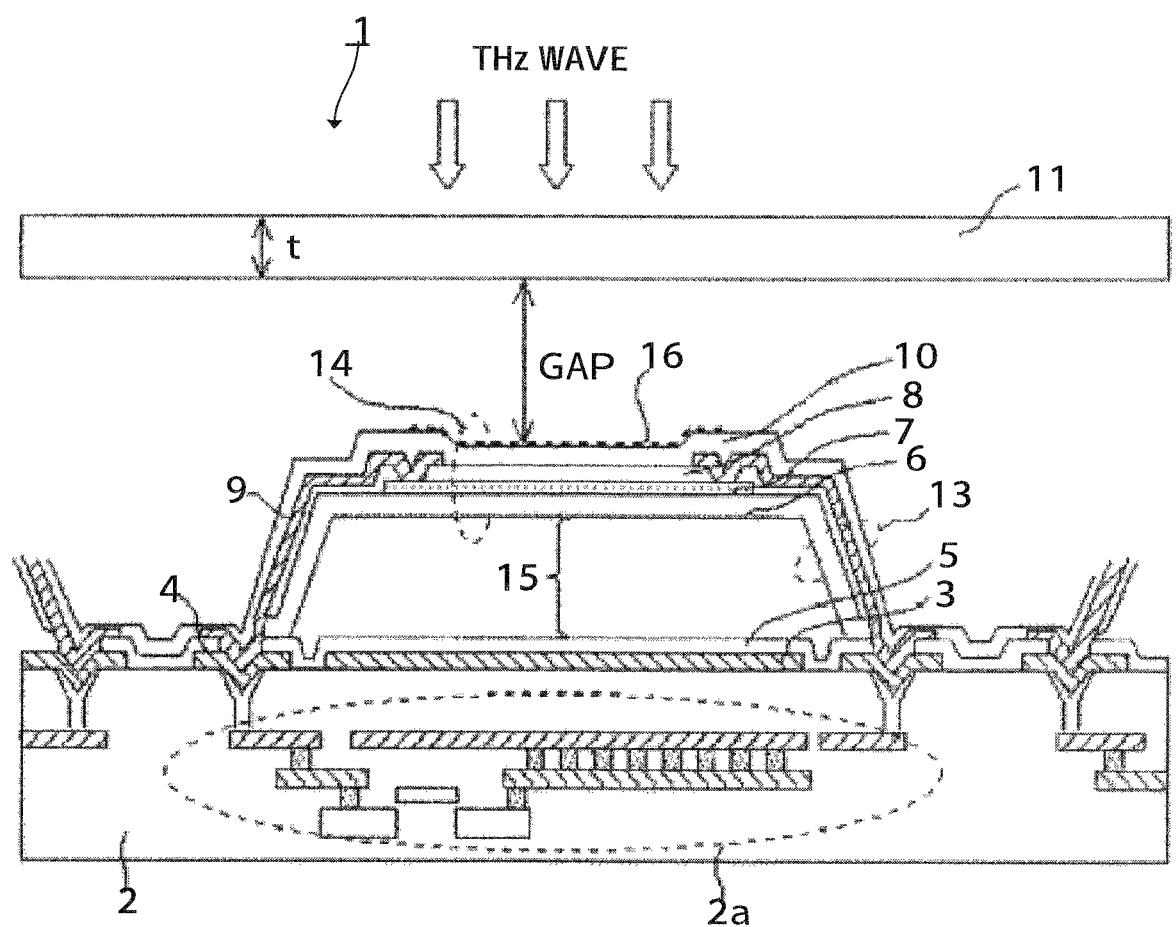
FIG. 8 is a sectional view schematically illustrating a structure of a bolometer-type THz-wave detector according to a second embodiment of the present invention.

Then, in this embodiment, in order to efficiently absorb the THz wave having transmitted the temperature detecting portion 14, as shown in FIG. 8, in addition to the structure of the first embodiment, an absorbing film 16 for absorbing the THz wave is added to the temperature detecting portion 14. Also, since a large change in the gap between the reflective film 3 and the temperature detecting portion 14 would depart from a conventional manufacturing condition and remarkably lower the yield, a gap between the reflective film 3 and the temperature detecting portion 14 (in more detail, a gap between the surface of the reflective film 3 and the center in the thickness direction of the temperature detecting portion 14, and since the absorbing film 16 is predominant in the configuration of this embodiment, a gap between the surface of the reflective film 3 and the absorbing film 16) is set on the basis of the wavelength of the infrared ray. Supposing that the wavelength of the infrared is 8 to 12 µm, ¼ of the wavelength is 2 to 3 µm, but since the sacrifice layer is preferably as thin as possible in manufacture, the gap between the reflective film 3 and the temperature detecting portion 14 is set in a range of approximately 1.5 to 2.5 µm in this embodiment. Moreover, based on correlation data between the sheet resistance of the temperature detecting portion 14 and an absorptance of an electromagnetic wave shown below, the sheet resistance of the temperature detecting portion 14 including the absorbing film 16 (actually, since the absorbing film 16 is predominant, the sheet resistance of the absorbing film 16) is set in a range so that the absorptance of the THz wave becomes a predetermined value or above.

Figure 10A:
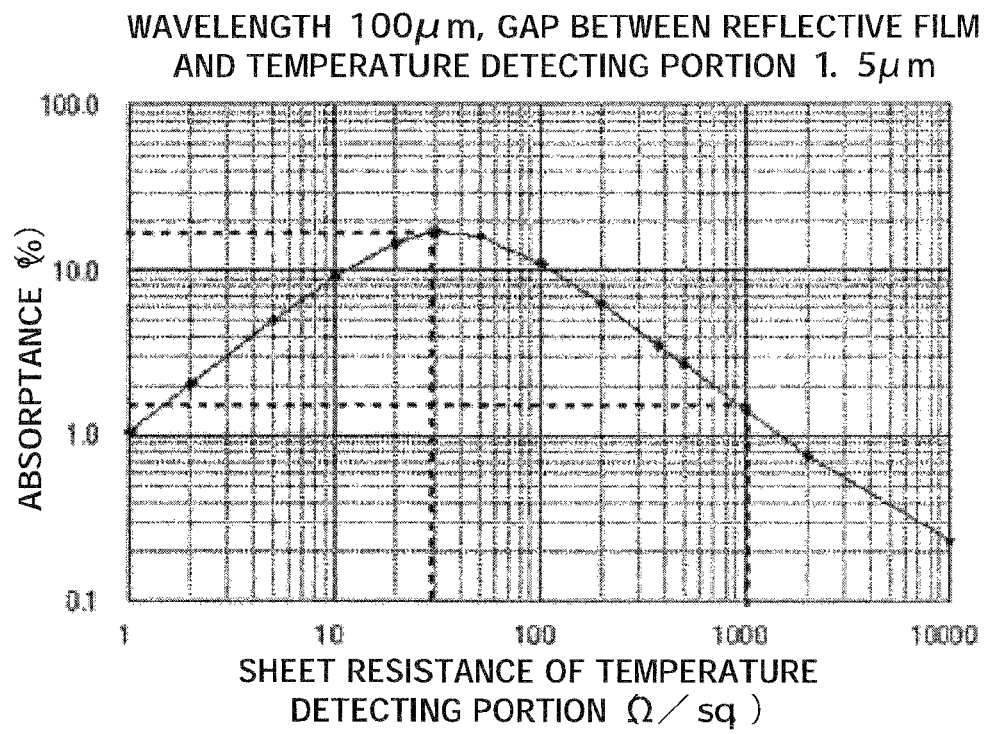
FIG. 10A is a diagram illustrating correlation between sheet resistance of a temperature detecting portion and an absorptance of a THz wave with a wavelength of 100 µm of the bolometer-type THz-wave detector according to a second embodiment of the present invention (when a gap between a reflective film and the temperature detecting portion is 1.5 µm).
Figure 10B:
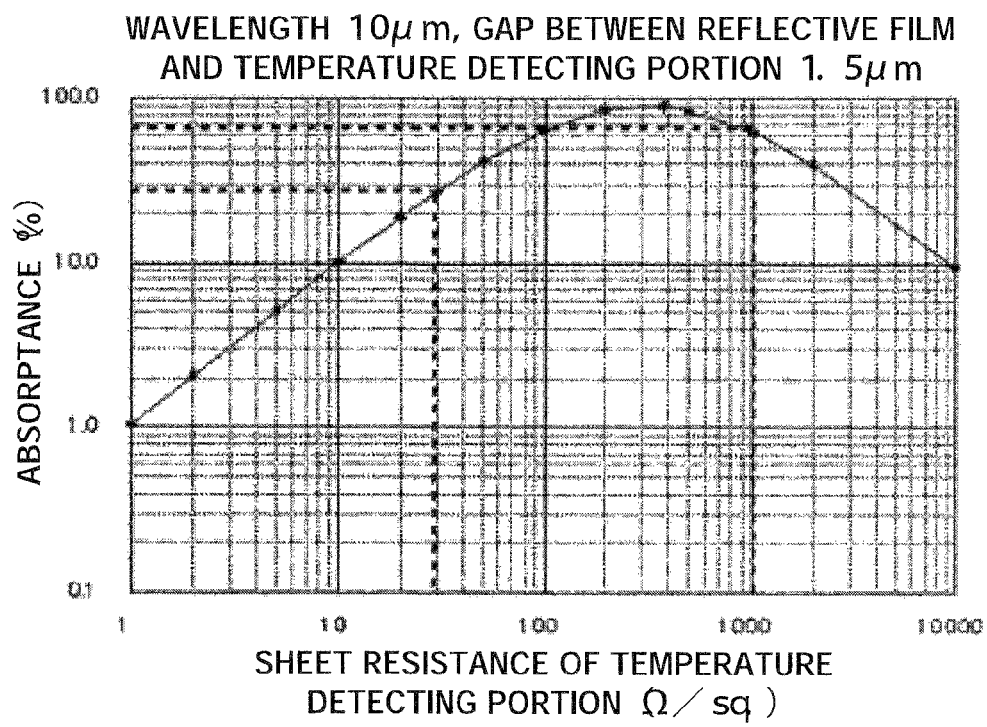
FIG. 10B is a diagram illustrating correlation between sheet resistance of a temperature detecting portion and an absorptance of an infrared ray with a wavelength of 10 µm of the bolometer-type THz-wave detector according to the second embodiment of the present invention (when a gap between a reflective film and the temperature detecting portion is 1.5 µm).

FIGS. 10A and 10B are diagrams illustrating correlation between the sheet resistance of the temperature detecting portion 14 and the absorptance of the electromagnetic wave when a gap between the reflective film 3 and the temperature detecting portion 14 is set at 1.5 µm, in which FIG. 10A shows an absorption characteristic of the THz wave with the wavelength of 100 µm, and FIG. 10B shows the absorption characteristic of the infrared ray with the wavelength of 10 µm. Here, when the sheet resistance of the temperature detecting portion 14 is set at a condition of a conventional infrared detector (1 kΩ/sq., for example), the absorptance of the infrared ray with the wavelength of 10 µm is approximately 60% from FIG. 10B. On the other hand, the absorptance of the THz wave with the wavelength of 100 µm is approximately 1.5% from FIG. 10A. Thus, it is known that the THz wave can be hardly detected under the usual infrared detector conditions. However, by bringing the sheet resistance of the temperature detecting portion 14 close to a peak position (30 Ω/sq.) in FIG. 10A, the absorptance of the THz wave with the wavelength 10 µm is drastically increased to approximately 18%.

Figure 11A:
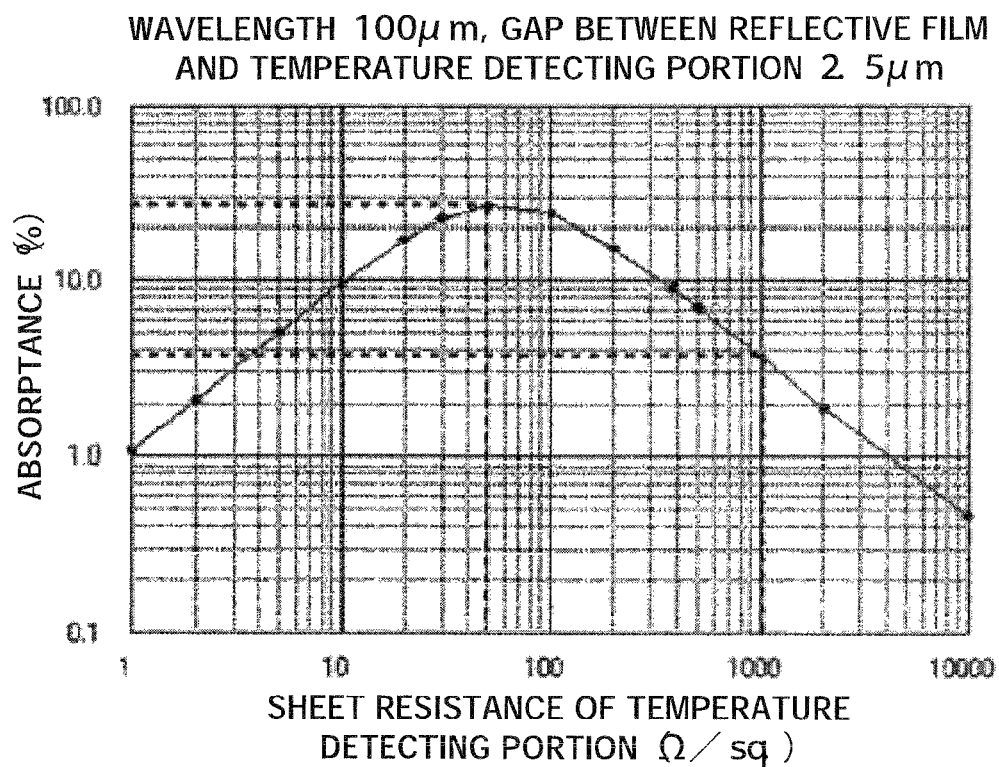
FIG. 11A is a diagram illustrating correlation between sheet resistance of a temperature detecting portion and an absorptance of a THz wave with a wavelength of 100 µm of the bolometer-type THz-wave detector according to the second embodiment of the present invention (when a gap between a reflective film and the temperature detecting portion is 2.5 µm).
Figure 11B:
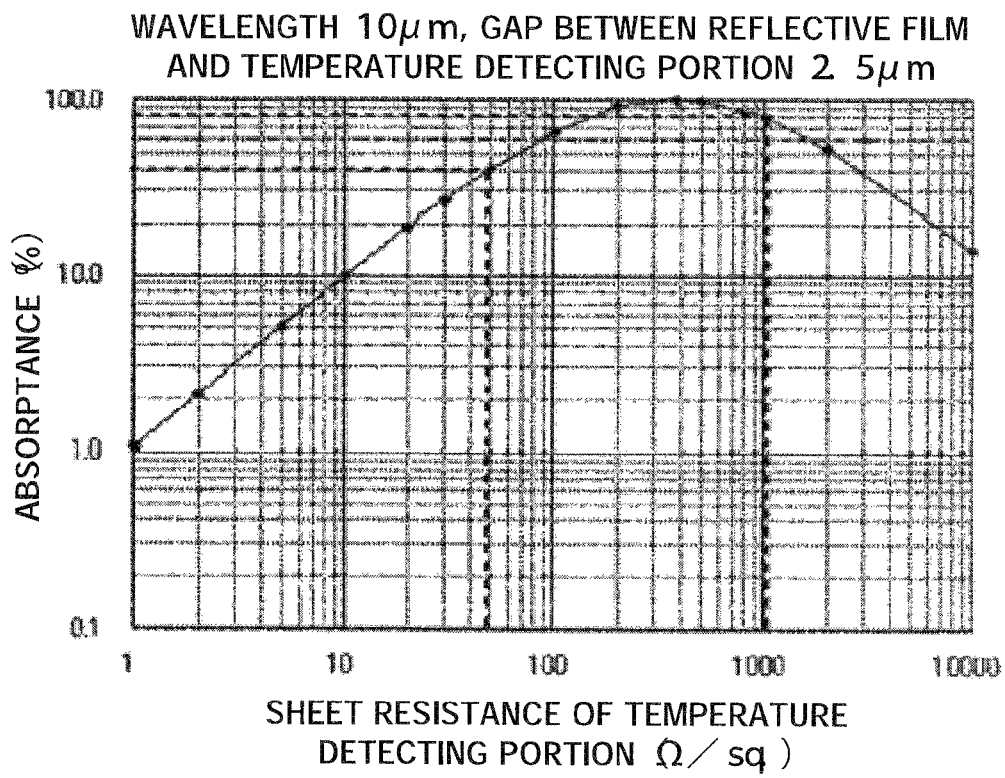
FIG. 11B is a diagram illustrating correlation between sheet resistance of a temperature detecting portion and an absorptance of an infrared ray with a wavelength of 10 µm of the bolometer-type THz-wave detector according to the second embodiment of the present invention (when a gap between a reflective film and the temperature detecting portion is 2.5 µm).

FIGS. 11A and 11B are diagrams illustrating correlation between the sheet resistance of the temperature detecting portion 14 and the absorptance of the electromagnetic wave when a gap between the reflective film 3 and the temperature detecting portion 14 is set at 2.5 µm, in which FIG. 11A shows an absorption characteristic of the THz wave with the wavelength 100 µm, while FIG. 11B shows an absorption characteristic of the infrared ray with the wavelength of 10 µm. Here, if the sheet resistance of the temperature detecting portion 14 is set at a condition of the conventional infrared detector (1 kΩ/sq., for example), the absorptance of the infrared ray with the wavelength of 10 µm is approximately 80% from FIG. 11B. On the other hand, the absorptance of the THz wave with the wavelength of 100 µm is approximately 3.8% from FIG. 11A. From this fact, it is known that under the condition of the usual infrared detector, the THz wave can be hardly detected. However, if the sheet resistance of the temperature detecting portion 14 is brought close to a peak position (50 Ω/sq.) in FIG. 11A, the absorptance of the THz wave with the wavelength 100 µm is drastically increased to approximately 18% as in FIG. 11A.

From the above results, though a peak position of the sheet resistance of the temperature detecting portion 14 depends on the gap between the reflective film 3 and the temperature detecting portion 14, by setting the sheet resistance of the temperature detecting portion 14 at a value close to the peak position, the absorptance of the THz wave can be drastically increased. Here, the usual infrared detector has a gap between the reflective film 3 and the temperature detecting portion 14 set approximately 1.5 to 2.5 µm, considering easiness to form or remove the sacrifice layer. In this embodiment, too, the gap between the reflective film 3 and the temperature detecting portion 14 is set in a range of approximately 1.5 to 2.5 µm, a preferable range of the sheet resistance of the temperature detecting portion 14 becomes 30 to 50 Ω/sq. However, since the THz wave can be sufficiently detected if the absorptance is 10% or more, it is only necessary that the sheet resistance of the temperature detecting portion 14 is within a range of 10 to 100 Ω/sq. from FIGS. 10A and 11A. The absorptance in FIGS. 10A, 10B, 11A, and 11B are not equal to the absorptance of an electromagnetic wave in FIGS. 7A, 7B, 7C, and 7D in the first embodiment, but that is because calculation parameters are different from each other. By inserting a band-pass filter or the like that shields the infrared ray into an incident face side of the bolometer-type THz-wave detector 1, only the THz wave can be efficiently detected.

A manufacturing method of the bolometer-type THz-wave detector 1 with the above structure will be described referring to FIG. 9.

First, similarly to the above-mentioned first embodiment, on a circuit substrate 2 on which a read-out integrated circuit 2a such as a CMOS circuit is formed, the reflective film 3 and the contact 4 are formed and on top of them, a first protective film 5 is formed, and then, the sacrifice layer 22 is formed in a region to be the temperature detecting portion 14. Then, a second protective film 6, the bolometer thin film 7, and the third protective film 8 are formed on the sacrifice layer 22. Subsequently, the first protective film 5, the second protective film 6 and the third protective film 8 on the contact 4, the third protective film 8 at the end portion of the bolometer thin film 7 are removed. Then, the electrode wiring 9 and the fourth protective film 10 are formed.

Figure 9:
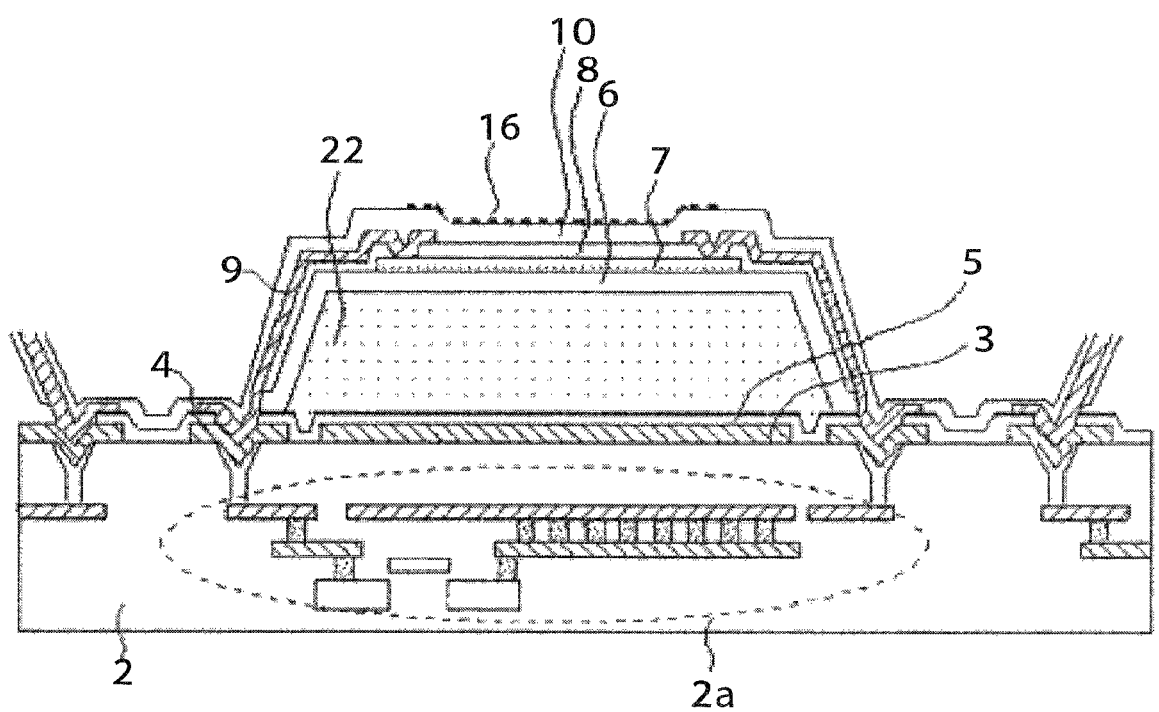
FIG. 9 is a sectional view illustrating a part of a manufacturing method of the bolometer-type THz-wave detector according to the second embodiment of the present invention.

Then, as shown in FIG. 9, a film of metal such as Al, Ti is formed by the sputtering method and then, a pattern is formed with the resist as the mask, and the absorbing film 16 is formed. At that time, the film thickness is set so that the sheet resistance of the temperature detecting portion 14 with the second protective film 6, the third protective film 8, the bolometer thin film 7, the fourth protective film 10, the absorbing film 16 together becomes approximately 10 to 100 Ω/sq. The metal may be any material that can set the sheet resistance of the temperature detecting portion 14 at approximately 10 to 100 Ω/sq. and not limited to Al or Ti.

After that, similarly to the first embodiment, the second protective film 6, the third protective film 8, and the fourth protective film 10 are partially etched. As a result, a through hole is formed on a predetermined region on the sacrifice layer 22 and polyimide is partially exposed. Next, by ashing using $O_2$ gas plasma, the sacrifice layer 22 is removed. By this arrangement, a pixel in the micro-bridge structure is formed in which the temperature detecting portion 14 is held by the supporting portion 13 in a state suspended from the circuit substrate 2. Then, the dielectric cover 11 machined in a lid state is formed so that a product of the refractive index and thickness of the dielectric material becomes larger than the wavelength of the THz wave. And the dielectric cover 11 is placed so as to cover the plurality of pixels so that the gap between the dielectric cover 11 and the temperature detecting portion 14 becomes integral multiples of a half wavelength of the THz wave, at least a part of it is fixed to the circuit substrate 2, and the bolometer-type THz-wave detector 1 is completed.

As mentioned above, in this embodiment, the dielectric cover 11 is arranged above the temperature detecting portion 14, the absorbing film 16 is added to the temperature detecting portion 14, the gap between the reflective film 3 and the temperature detecting portion 14 is set on the basis of the wavelength of the infrared ray, and the sheet resistance of the temperature detecting portion 14 is set at approximately 10 to 100 Ω/sq. so that the absorptance of the THz wave can be further improved. Thus, the high-performance bolometer-type THz-wave detector 1 can be manufactured with a good yield. Also, since the infrared ray can be also absorbed by this bolometer-type THz-wave detector 1 with a considerably high absorptance, that can be used as the bolometer-type infrared detector as it is.

EXAMPLE 3

Next, the bolometer-type THz-wave detector according to a third embodiment of the present invention will be described referring to FIGS. 12 to 15.

Figure 12:
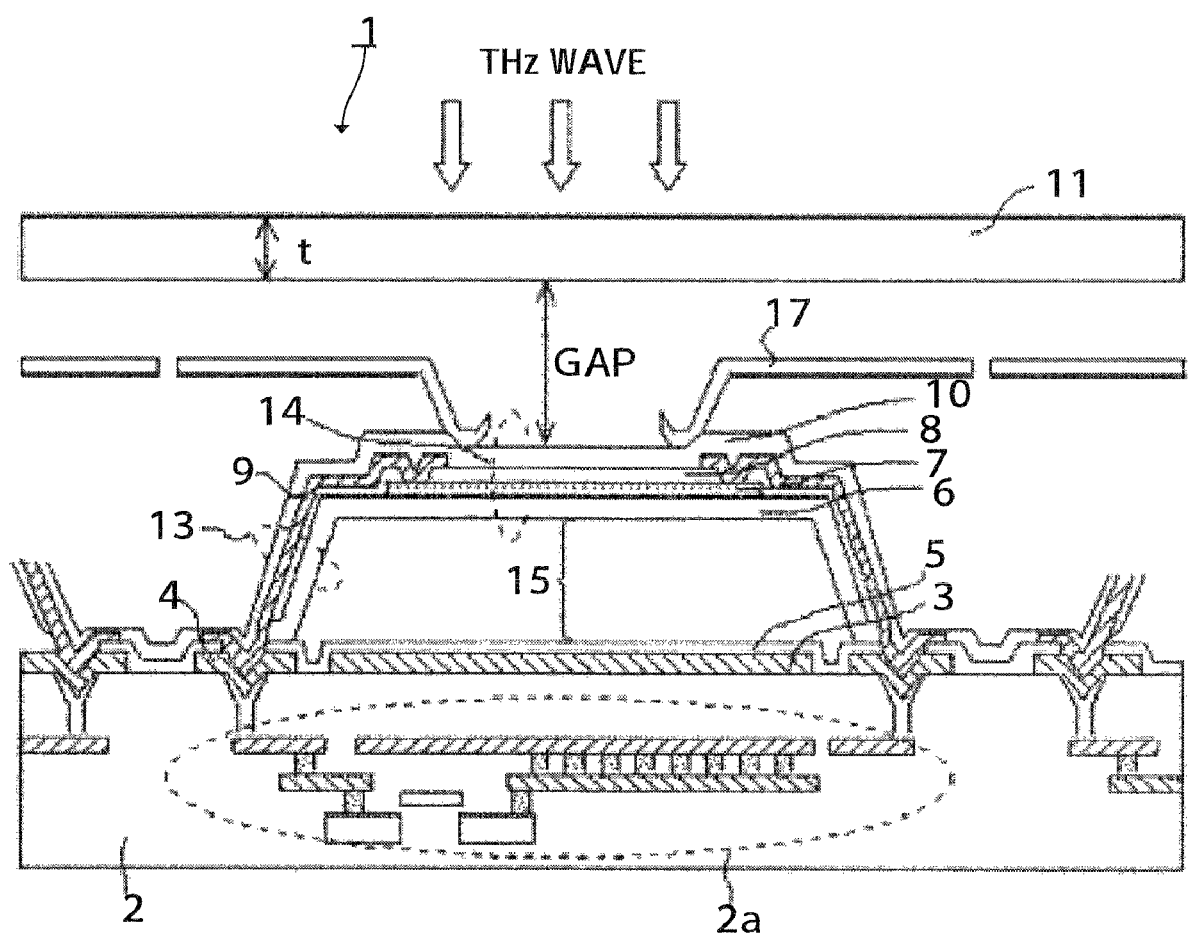
FIG. 12 is a sectional view schematically illustrating a structure of the bolometer-type THz-wave detector according to a third embodiment of the present invention.
Figure 14:
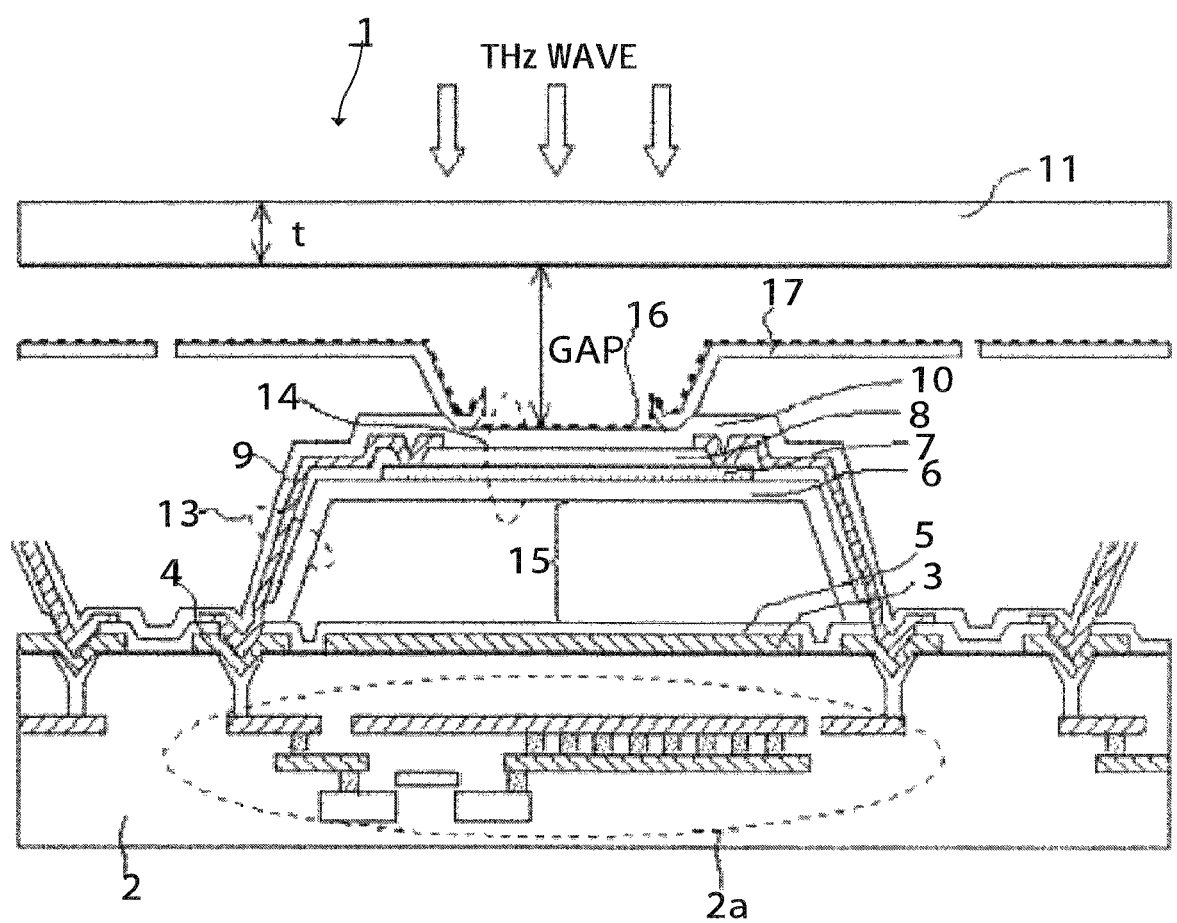
FIG. 14 is a sectional view schematically illustrating another structure of the bolometer-type THz-wave detector according to the third embodiment of the present invention.

In the above-mentioned first embodiment, the dielectric cover 11 is arranged above the temperature detecting portion 14 so that the THz wave can be efficiently absorbed between the dielectric cover 11 and the temperature detecting portion 14. In the second embodiment, the absorbing film 16 is further added to the temperature detecting portion 14, and the sheet resistance of the temperature detecting portion 14 is set to approximately 10 to 100 Ω/sq. so that the THz wave can be efficiently absorbed between the reflective film 3 and the temperature detecting portion 14. However, with these structures, the supporting portion 13 around the temperature detecting portion 14 or the THz wave incident to a region between the pixels is not utilized. Thus, in this embodiment, in addition to the structure of the first embodiment and the structure of the second embodiment, as shown in FIG. 12 or FIG. 14, a canopy 17 extending outward from the peripheral portion of the temperature detecting portion 14 is formed on the temperature detecting portion 14. By this arrangement, the THz wave incident to the supporting portion 13 and the region between the pixels can be made available so that the THz wave can be absorbed more efficiently.

Figure 15:
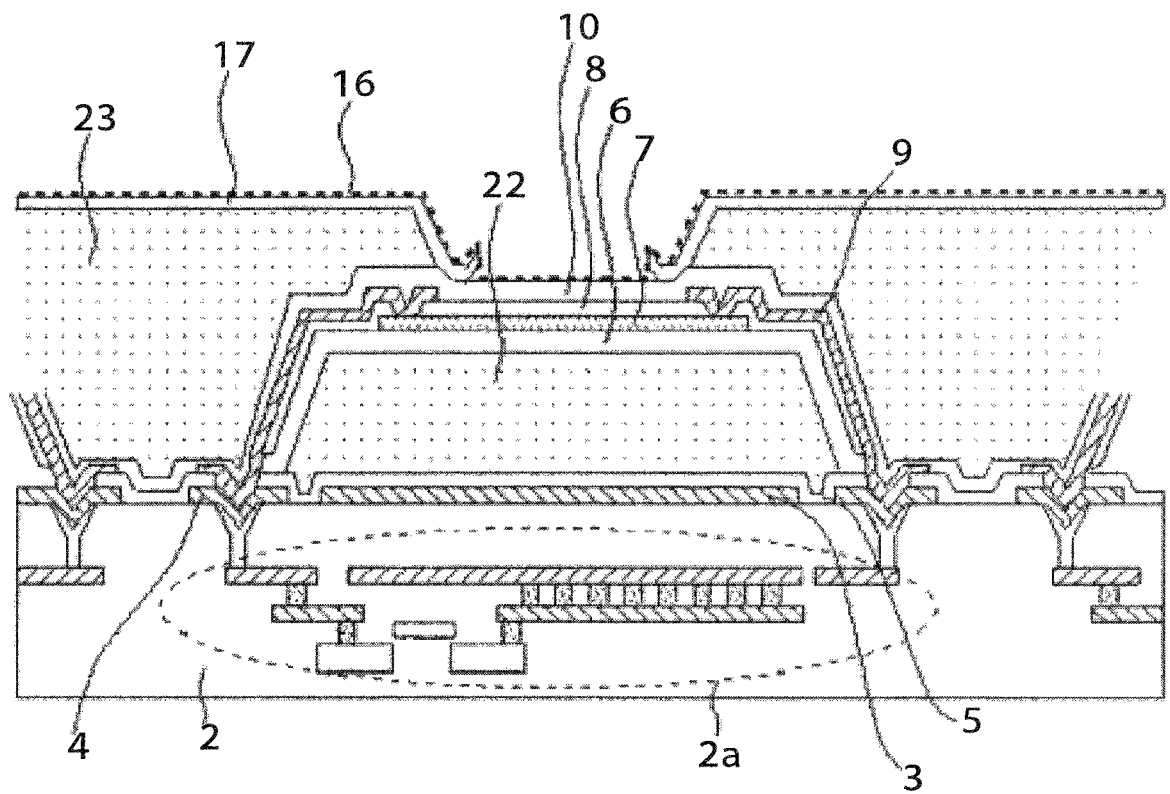
FIG. 15 is a sectional view illustrating a part of another manufacturing method of the bolometer-type THz-wave detector according to the third embodiment of the present invention.
Figure 16:
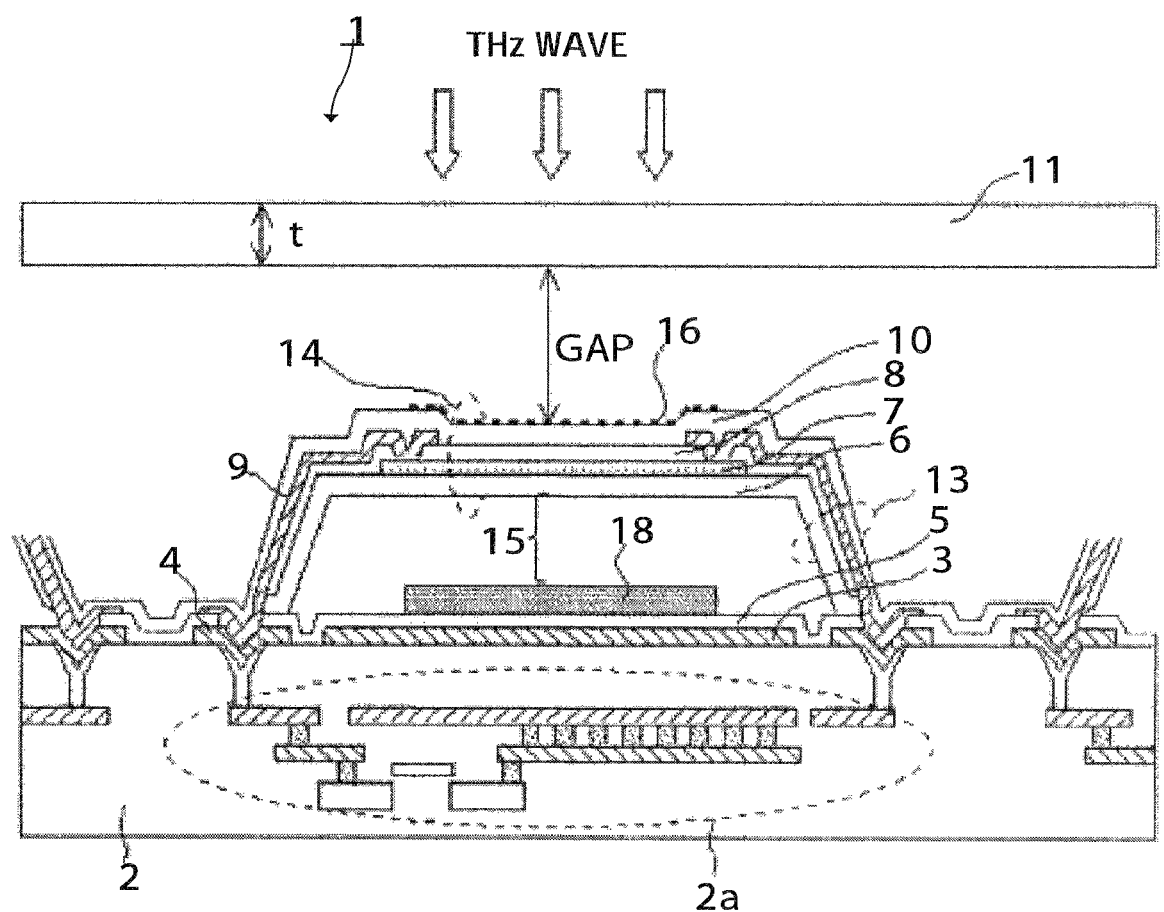
FIG. 16 is a sectional view schematically illustrating a structure of the bolometer-type THz-wave detector according to a fourth embodiment of the present invention.

A manufacturing method of the bolometer-type THz-wave detector 1 in the above structure in FIG. 12 (FIG. 14) will be described referring to FIG. 13 (FIG. 15).

First, similarly to the above-mentioned first embodiment, on the circuit substrate 2 on which the read-out integrated circuit 2a such as a CMOS circuit is formed, the reflective film 3 and the contact 4 are formed and on top of it, the first protective film 5 is formed. And then, the sacrifice layer 22 is formed in a region to be the temperature detecting portion 14. Then, on the sacrifice layer 22, the second protective film 6, the bolometer thin film 7, the third protective film 8 are formed. Subsequently, the first protective film 5, the second protective film 6, and the third protective film 8 on the contact 4 and the third protective film 8 at the end portion of the bolometer thin film 7 are removed. Then, the electrode wiring 9 and the fourth protective film 10 are formed.

After that, by the plasma etching using a mixed gas of methane monofluoride and oxygen, etching is applied to a predetermined region of the second protective film 6, the third protective film 8, and the fourth protective film 10. By this arrangement, a through hole is formed in a predetermined region on the sacrifice layer 22 so as to partially expose polyimide.

Figure 13:
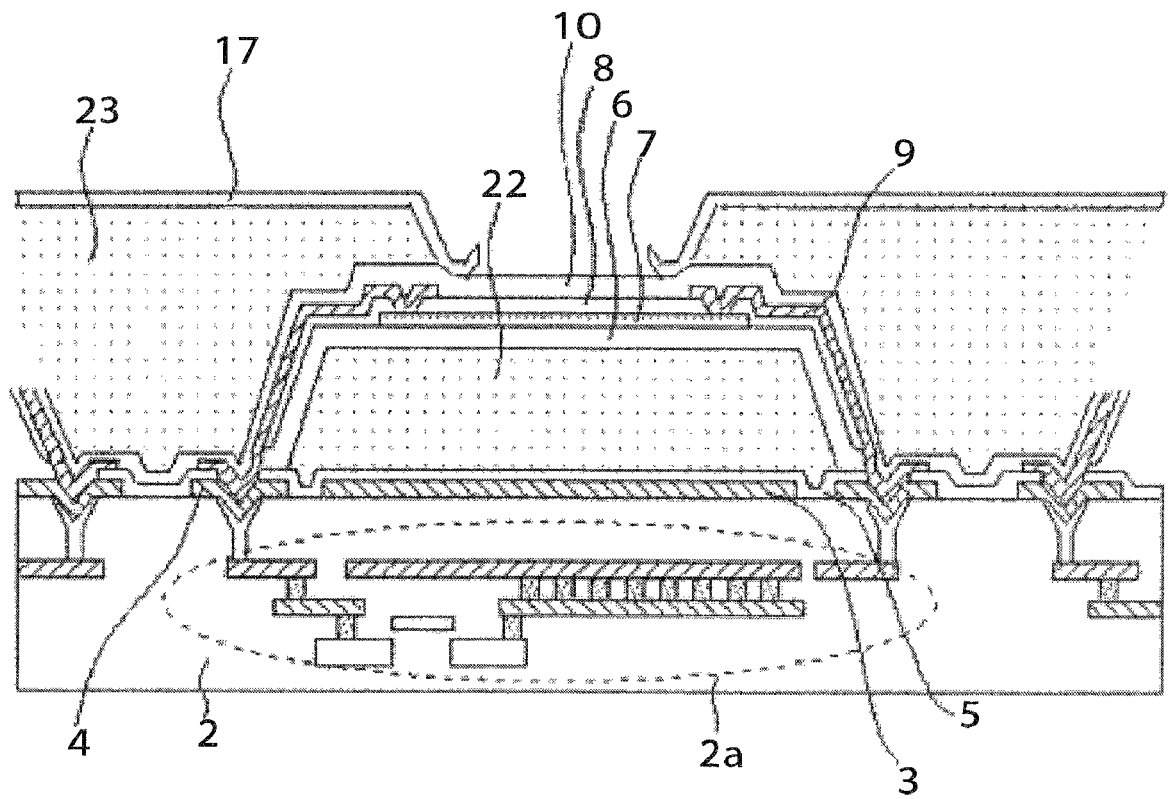
FIG. 13 is a sectional view illustrating a part of a manufacturing method of the bolometer-type THz-wave detector according to the third embodiment of the present invention.

Next, as shown in FIG. 13, photosensitive polyimide is applied on the whole face of the circuit substrate 2 and that is exposed and developed so that the peripheral part of the temperature detecting portion 14 is exposed. After that, heat treatment is conducted, and a sacrifice layer 23 is formed in a center part of the temperature detecting portion 14 and a region between the adjacent temperature detecting portions 14. The thickness of the sacrifice layer 23 is approximately 0.5 to 3 µm, for example.

Next, an insulating material such as a silicon oxide film (SiO, $SiO_2$), a silicon nitride film (SiN, $Si_3N_4$), a silicon oxynitride film (SiON) or the like is formed with the film thickness of approximately 300 to 600 nm. Subsequently, the insulating material on the center part of the temperature detecting portion 14 is removed so as to form the canopy 17.

In the case of the bolometer-type THz-wave detector 1 with the structure in FIG. 14, as shown in FIG. 15, a film of metal such as Al, Ti is further formed by the sputtering method and then, a pattern is formed with the resist as a mask so that the absorbing film 16 is formed on the temperature detecting portion 14 and the canopy 17. At that time, the film thickness is set so that the sheet resistance of the temperature detecting portion 14 together with the second protective film 6, the third protective film 8, the bolometer thin film 7, the fourth protective film 10, the absorbing film 16, and the canopy 17 becomes approximately 10 to 100 Ω/sq.

After that, a through hole is formed at the canopy 17 between the adjacent pixels so that polyimide is partially exposed. Then, by ashing using $O_2$ gas plasma, the sacrifice layer 22 and the sacrifice layer 23 are removed. By this arrangement, the pixel in the micro-bridge structure in which the temperature detecting portion 14 is held by the supporting portion 13 in a state suspended from the circuit substrate 2 is formed. And the dielectric cover 11 machined into a lid state is formed so that the product of the refractive index and the thickness of the dielectric material becomes larger than the wavelength of the THz wave similarly to the first embodiment. And the dielectric cover 11 is placed so as to cover the plurality of pixels so that the gap between the dielectric cover 11 and the temperature detecting portion 14 (that may be the gap between the dielectric cover and the canopy 17) becomes integral multiples of the half wavelength of the THz wave, and at least a part thereof is fixed to the circuit substrate 2, and the bolometer-type THz-wave detector 1 is completed.

As mentioned above, by forming the canopy 17 extending outward from the peripheral portion of the temperature detecting portion 14 on the temperature detecting portion 14, the THz wave incident to the supporting portion 13 and the region between the pixels can be also effectively utilized. Thus, the absorptance of the THz wave can be improved better than the first and second embodiments, and a high-performance bolometer-type THz-wave detector 1 can be manufactured with a good yield. Also, since this bolometer-type THz-wave detector 1 can also absorb the infrared ray with a considerably high absorptance, it can be also used as the bolometer-type infrared detector as it is.

EXAMPLE 4

Next, the bolometer-type THz-wave detector according to a fourth embodiment of the present invention will be described referring to FIGS. 16 to 20B.

In the bolometer-type THz-wave detector of the present invention, in order to form the optical resonance structure suitable for the THz wave, the gap between the reflective film 3 and the temperature detecting portion 14 is preferably wide. On the other hand, if the gap between the reflective film 3 and the temperature detecting portion 14 is made wider, the formation or removal of the sacrifice layer 22 becomes difficult. Then, in this embodiment, by interposing a member with a predetermined refractive index (referred to as an optical film 18) between the reflective film 3 and the temperature detecting portion 14, the optical path length with the refractive index considered is changed.

It is only necessary that the optical film 18 is a member with a large refractive index, a small absorption of the THz wave and favorable process suitability. For example, a silicon oxide film (SiO, $SiO_2$), a silicon nitride film (SiN, $Si_3N_4$), a silicon oxynitride film (SiON), a silicon film or the like may be used. Since the optical path length between the reflective film 3 and the temperature detecting portion 14 is changed by interposing the optical film 18, the sheet resistance of the temperature detecting portion 14 is set on the basis of the FIGS. 19A, 19B, 20A, and 20B and FIGS. 10A, 10B, 11A, and 11B in the second embodiment.

Figure 19A:
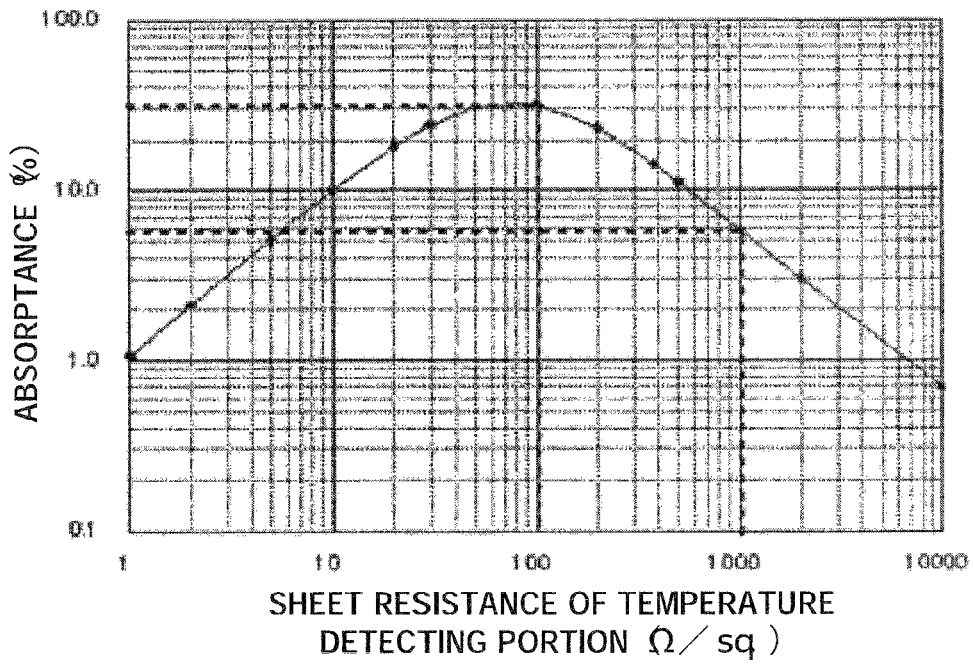
FIG. 19A is a diagram illustrating correlation between sheet resistance of a temperature detecting portion and an absorptance of a THz wave with a wavelength of 100 μm of the bolometer-type THz-wave detector according to the fourth embodiment of the present invention (when a gap between a reflective film and the temperature detecting portion is 1.5 μm).
Figure 19B:
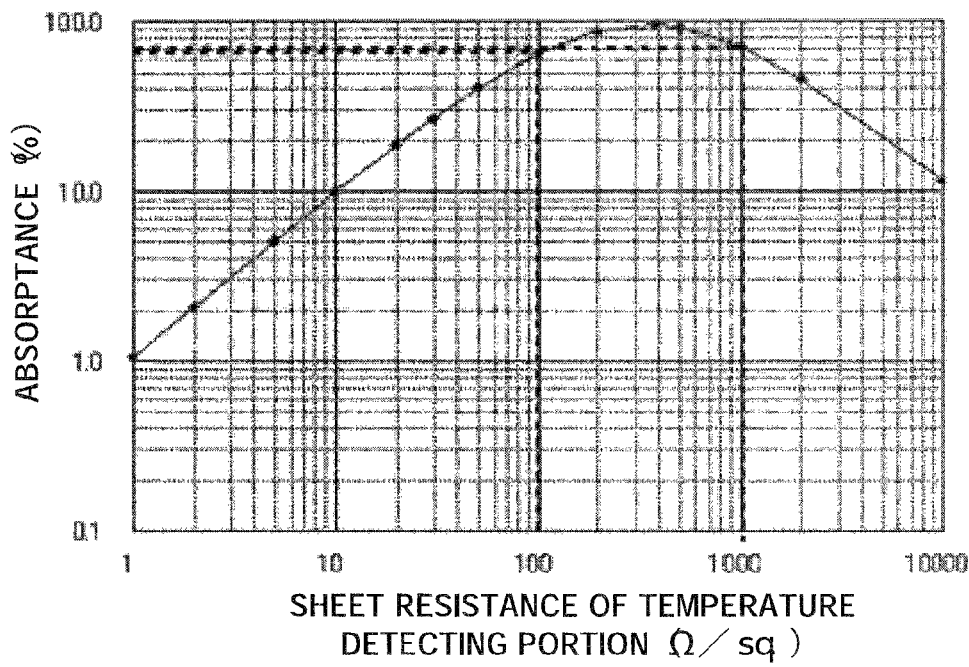
FIG. 19B is a diagram illustrating correlation between sheet resistance of a temperature detecting portion and an absorptance of an infrared ray with a wavelength of 10 μm of the bolometer-type THz-wave detector according to the fourth embodiment of the present invention (when a gap between a reflective film and the temperature detecting portion is 1.5 μm).
Figure 21A:
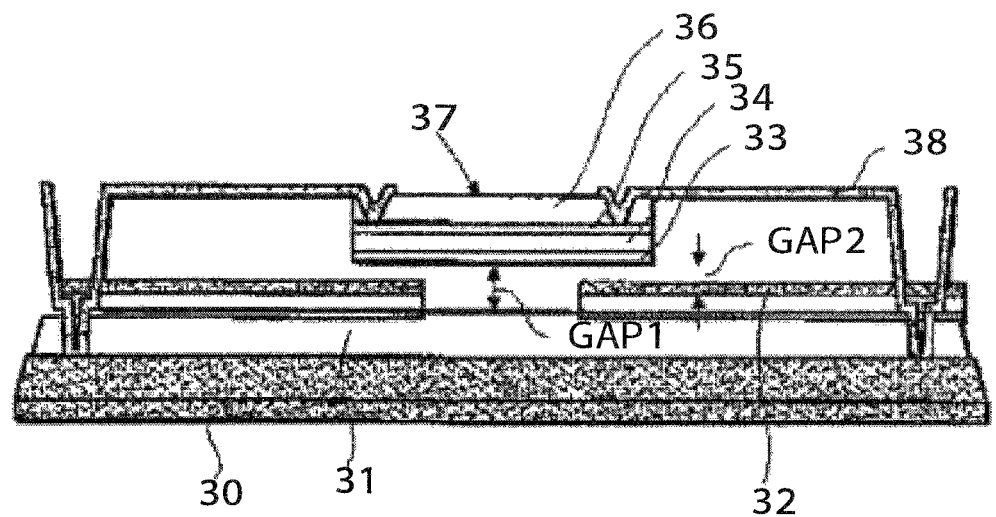
FIG. 21A is a sectional view illustrating a structure of a conventional THz-wave detector.
Figure 21B:
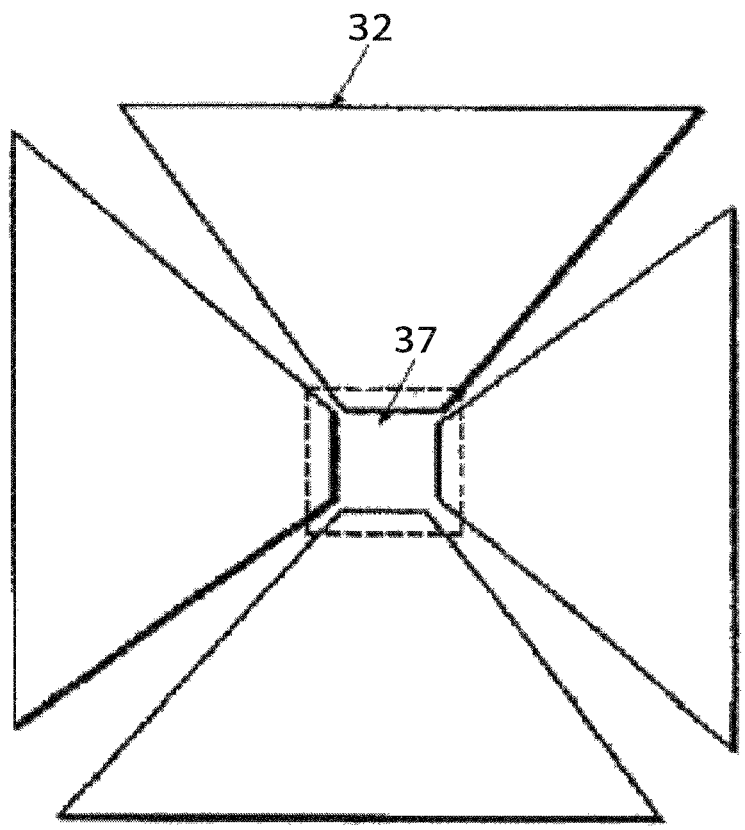
FIG. 21B is a top view illustrating a structure of a conventional THz-wave detector.
Figure 22A:
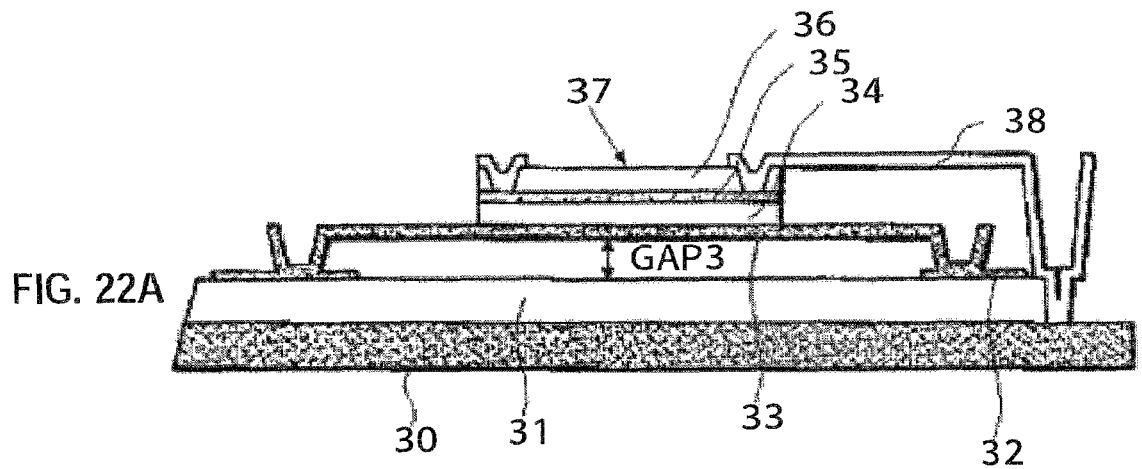
FIG. 22A is a sectional view illustrating a structure of a conventional THz-wave detector.
Figure 22B:
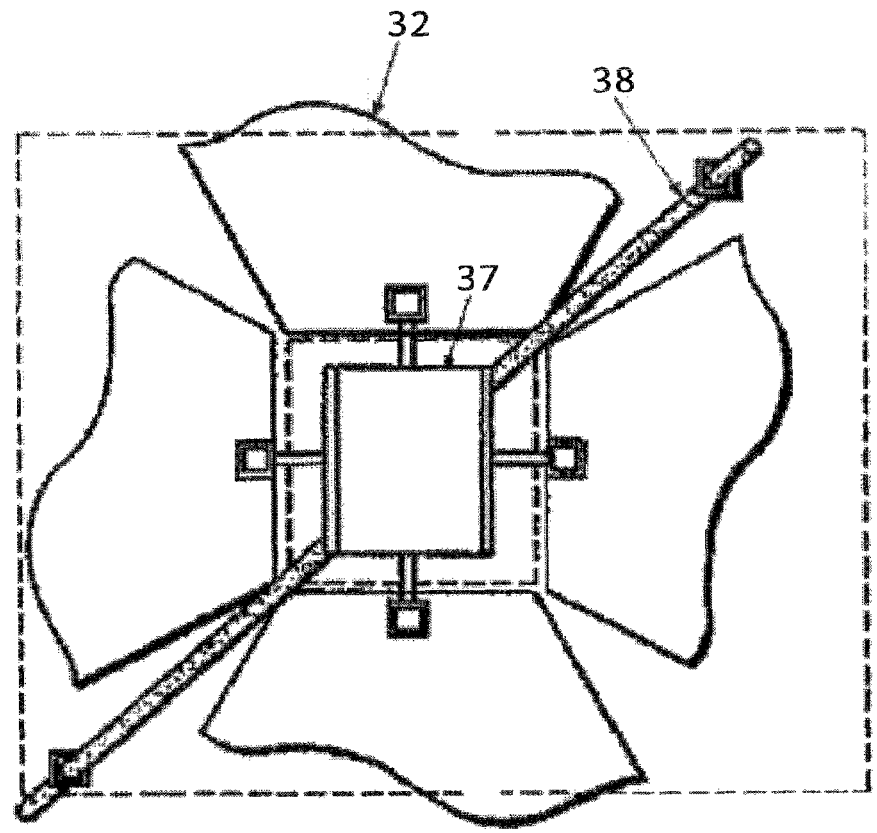
FIG. 22B is a top view illustrating a structure of a conventional THz-wave detector.

FIGS. 19A and 19B are diagrams illustrating correlation between the sheet resistance of the temperature detecting portion 14 and the absorptance of the electromagnetic wave when a silicon film with the refractive index of 3.4 and the film thickness of 0.5 μm is provided on the reflective film 3, and the gap between the reflective film 3 and the temperature detecting portion 14 is set to 1.5 μm, in which FIG. 19A shows the absorption characteristic of the THz wave with the wavelength of 100 μm and FIG. 19B shows the absorption characteristic of the infrared with the wavelength of 10 μm. When FIGS. 19A, 19B are compared with FIGS. 10A, 10B, there is no particular difference in the absorption characteristic of the infrared, but the absorption characteristic of the THz wave has its peak position shifted to the right direction in the figure (direction with larger sheet resistance). Also, the absorptance of the THz wave is increased as a whole. That is considered to be because the optical path length becomes 3.2 μm by interposition of the silicon film with the refractive index of 3.4 and the film thickness of 0.5 μm which is close to the optical resonance condition of the THz wave.

FIGS. 20A and 20B are diagrams illustrating the correlation between the sheet resistance of the temperature detecting portion 14 and the absorptance of the electromagnetic wave when a silicon film with the refractive index of 3.4 and the film thickness of 0.5 μm is provided on the reflective film 3, and the gap between the reflective film 3 and the temperature detecting portion 14 is set to 2.5 μm, in which FIG. 20A shows the absorption characteristic of the THz wave with the wavelength of 100 μm and FIG. 20B shows the absorption characteristic of the infrared with the wavelength of 10 μm. When FIGS. 20A, 20B are compared with FIGS. 11A, 11B, the absorption characteristic of the infrared ray has its peak position shifted to the left direction in the figure (direction with smaller sheet resistance), and the absorptance of the infrared ray is lowered as a whole. On the other hand, the absorption characteristic of the THz wave has its peak position shifted to the right direction in the figure (direction with larger sheet resistance), and the absorptance of the THz wave is increased as a whole. That is considered to be because the optical path length becomes 4.2 form by interposition of the silicon film with the refractive index of 3.4 and the film thickness of 0.5 μm, which is far from the optical resonance condition for the infrared ray and close to the optical resonance condition for the THz wave.

From the above results, by interposing the optical film 18 with the predetermined refractive index on the reflective film 3, even though the gap between the reflective film 3 and the temperature detecting portion 14 is not changed, the absorptance of the THz wave can be drastically increased. In this case, the preferable range of the sheet resistance of the temperature detecting portion 14 depends on the refractive index and film thickness of the optical film 18. However, similarly to the first embodiment, even though being somewhat offset from the peak position, the THz wave can be sufficiently detected if the absorptance is 10% or more. Thus, it is only necessary that the sheet resistance of the temperature detecting portion 14 is in a range of 10 to 100 Ω/sq. from FIGS. 19A and 20A. In this embodiment, too, by inserting a bandpass filter or the like shielding the infrared ray on the incident face side of the bolometer-type THz-wave detector 1, only the THz wave can be efficiently detected.

The manufacturing method of the bolometer-type THz-wave detector with the above structure will be described referring to FIGS. 17 and 18.

First, similarly to the first and second embodiments, on the circuit substrate 2 on which the read-out integrated circuit 2a such as the CMOS circuit is formed, the reflective film 3 and the contact 4 are formed, and on top of that, the first protective film 5 is formed.

Figure 17:
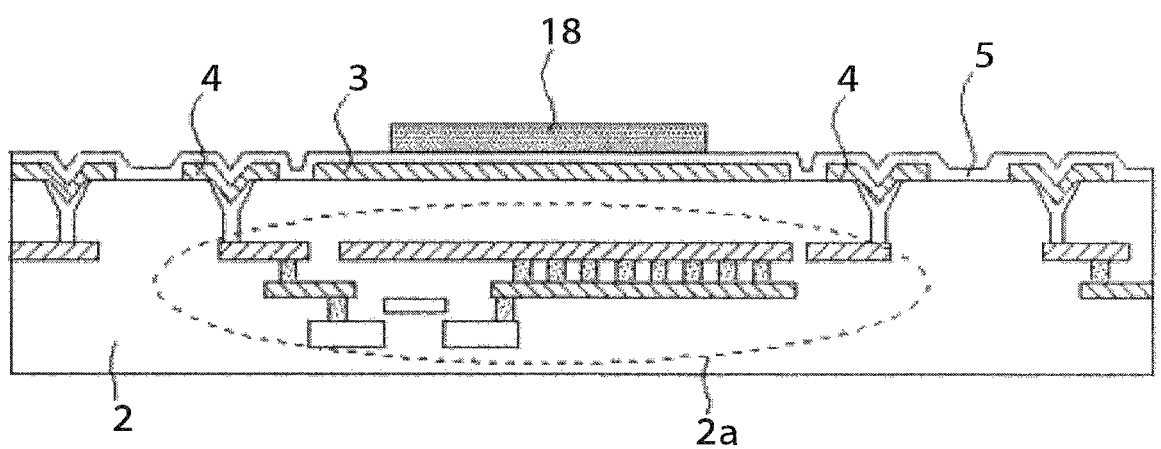
FIG. 17 is a sectional view illustrating a part of a manufacturing method of the bolometer-type THz-wave detector according to the fourth embodiment of the present invention.

Next, in this embodiment, as shown in FIG. 17, a film of a silicon oxide film (SiO, $SiO_2$), a silicon nitride film (SiN, $Si_3N_4$), a silicon oxynitride film (SiON), a silicon film or the like with a predetermined film thickness is formed by the plasma CVD method or the like, a pattern is formed with the resist as the mask, and the optical film 18 is formed on the reflective film 3. The optical film 18 does not necessarily have to be formed on the whole surface of the reflective film 3 but it is only necessary to form the film at least on a portion opposed to the temperature detecting portion 14. If the film thickness of the optical film 18 is made larger, the optical path length is increased and the absorption of the THz wave can be increased.

Figure 18:
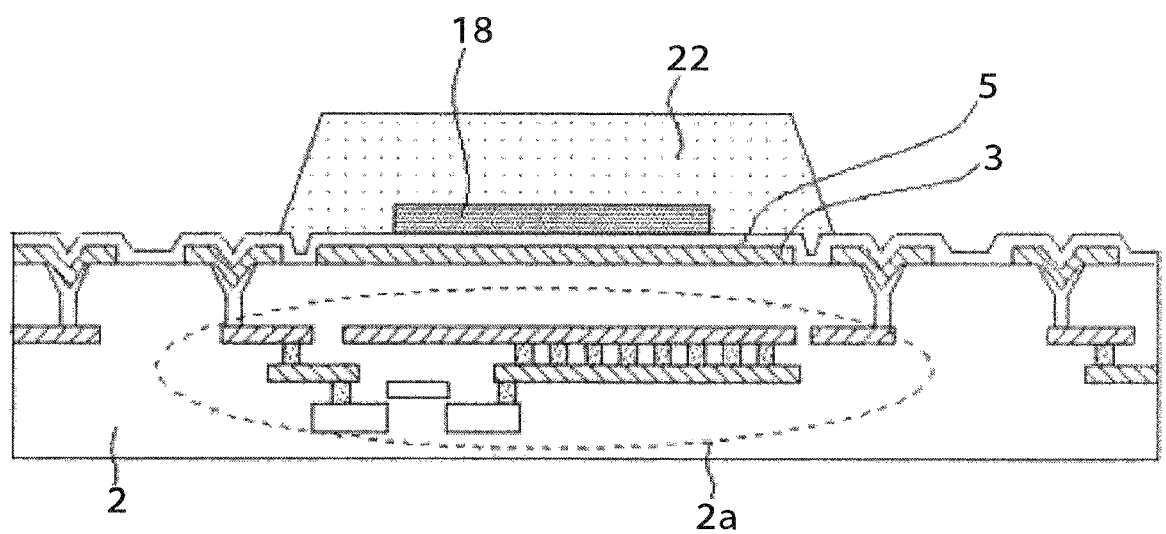
FIG. 18 is a sectional view illustrating a part of the manufacturing method of the bolometer-type THz-wave detector according to the fourth embodiment of the present invention.

Next, as shown in FIG. 18, an organic film such as photosensitive polyimide film is applied on the whole surface of the circuit substrate 2, baked at a temperature of approximately 400° C. and the sacrifice layer 22 for forming the microbridge structure is formed. At that time, the photosensitive polyimide film after being cured is set so that the gap between the reflective film 3 and the temperature detecting portion 14 (in more detail, a gap between the surface of the reflective film 3 and the center in the thickness direction of the temperature detecting portion 14, and since the absorbing film 16 is predominant in the configuration of this embodiment, a gap between the surface of the reflective film 3 and the absorbing film 16) is approximately ¼ of the wavelength of the infrared ray (1.5 to 2.5 μm, for example).

After that, similarly to the first embodiment, the second protective film 6, the bolometer thin film 7, and the third protective film 8 are formed on the sacrifice layer 22. Then, the first protective film 5, the second protective film 6 and the third protective film 8 on the contact 4 and the third protective film 8 at the end portion of the bolometer thin film 7 are removed. Next, the electrode wiring 9 and the fourth protective film 10 are formed.

Next, by the sputtering method, a film of metal such as Al, Ti is formed, a pattern is formed with the resist as the mask, and the absorbing film 16 is formed on the temperature detecting portion 14. At that time, the film thickness is set so that the sheet resistance of the temperature detecting portion 14 with the second protective film 6, the third protective film 8, the bolometer thin film 7, the fourth protective film 10, and the absorbing film 16 together becomes approximately 10 to 100 Ω/sq. If the canopy 17 is to be formed on the temperature detecting portion 14 as in the third embodiment, the sacrifice layer 23 is formed at the center portion of the temperature detecting portion 14 and a region between the adjacent temperature detecting portions 14. Next, the insulating member is formed on the sacrifice layer 23, and the insulating member at the center part of the temperature detecting portion 14 is removed so as to form the canopy 17. Subsequently, the absorbing film 16 is formed on temperature detecting portion 14 and the canopy 17.

After that, by ashing using $O_2$ gas plasma, the sacrifice layer 22 (or the sacrifice layer 22 and the sacrifice layer 23) is removed. By this arrangement, the pixel in the micro-bridge structure in which the temperature detecting portion 14 is suspended by the supporting portion 13 from the circuit substrate 2 is completed. And similarly to the first embodiment, the dielectric cover 11 machined into a lid state is formed so that a product of the refractive index and thickness of the dielectric material becomes larger than the wavelength of the THz wave. And the dielectric cover 11 is placed so as to cover the plurality of pixels so that the gap between the dielectric cover 11 and the temperature detecting portion 14 (it may be a gap between the dielectric cover 11 and the canopy 17) becomes integral multiples of a half wavelength of the THz wave, at least a part of it is fixed to the circuit substrate 2, and the bolometer-type THz-wave detector 1 is completed.

As mentioned above by forming the optical film 18 on the reflective film 3 so as to increase the optical path length between the reflective film 3 and the temperature detecting portion 14 and by setting the sheet resistance of the temperature detecting portion 14 approximately at 10 to 100 Ω/sq., the absorptance of the THz wave can be improved more than in the second and third embodiments. Thus, the high-performance bolometer-type THz-wave detector 1 can be manufactured with a high yield. Also, since the bolometer-type THz-wave detector 1 can absorb the infrared with a considerably high absorptance, it can be used as the bolometer-type infrared detector as well.

In each of the above embodiments, the bolometer-type THz-wave detector 1 provided with the bolometer thin film as the temperature detecting portion has been described, but the present invention is not limited to the above embodiments. For example, it may be similarly applied to those provided with a thermopile as the temperature detecting portion. Also, a case where the THz wave with the wavelength of approximately 30 μm to 1 mm is detected has been described in each of the above embodiments, but it may be also applied to an electromagnetic wave with a longer wavelength.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

The present application is based on Japanese Patent Application No. 2007-081828 filed with Japan Patent Office on Mar. 27, 2007, whose contents are incorporated herein by reference.

What is claimed is:

1. A bolometer-type THz-wave detector comprising:
   a substrate provided with a read-out integrated circuit;
   a temperature detecting portion provided with a bolometer thin film;
   a supporting portion arranged on said substrate and supporting said temperature detecting portion so that one face of said temperature detecting portion and said substrate are opposed to each other with a predetermined gap;
   a dielectric member opposed to the other face of said temperature detecting portion with a predetermined gap; and
   electrode wiring connecting the read-out integrated circuit and the bolometer thin film,
   wherein said bolometer-type THz-wave detector is a two-dimensional array detector in which a plurality of pixels are arranged;
   said plurality of pixels are covered by said dielectric member, and
   at least a part of said dielectric member is fixed to said substrate.

2. The bolometer-type THz-wave detector according to claim 1, wherein said dielectric member is brought into close contact with the substrate around said plurality of pixels over the entire circumference, and
   inside of said dielectric member containing said pixels is in a vacuum or pressure reduction state.

3. A bolometer-type THz-wave detector comprising:
   a substrate provided with a read-out integrated circuit;
   a temperature detecting portion provided with a bolometer thin film;
   a supporting portion arranged on said substrate and supporting said temperature detecting portion so that one face of said temperature detecting portion and said substrate are opposed to each other with a predetermined gap;
   a dielectric member opposed to the other face of said temperature detecting portion with a predetermined gap;
   electrode wiring connecting the read-out integrated circuit and the bolometer thin film;
   an absorbing film constituting said temperature detecting portion and absorbing said THz wave; and
   a reflective film formed on a face of said substrate opposed to the temperature detecting portion and reflecting said THz wave and forming an optical resonance structure together with said temperature detecting portion,
   wherein a gap between said reflective film and said temperature detecting portion is set on the basis of a wavelength of an infrared ray and sheet resistance of said temperature detecting portion is set on the basis of said THz wave.

4. The bolometer-type THz-wave detector according to claim 3, further comprising:
   a canopy extending outward from a peripheral portion of said temperature detecting portion,
   wherein said absorbing film is formed on the canopy.

5. The bolometer-type THz-wave detector according to claim 3, wherein a gap between said reflective film and said temperature detecting portion is set within a range of 1.5 to 2.5 μm; and
   the sheet resistance of said temperature detecting portion has a value set on the basis of correlation between the sheet resistance of said temperature detecting portion and an absorptance of said THz wave.

6. The bolometer-type THz-wave detector according to claim 5, wherein the sheet resistance of said temperature detecting portion is set in a range of 10 to 100 Ω/square.

7. The bolometer-type THz-wave detector according to claim 3, wherein the sheet resistance of said temperature detecting portion is set in a range in which the absorptance of said THz wave becomes 10% or more.

8. A bolometer-type THz-wave detector comprising:
a substrate provided with a read-out integrated circuit;
a temperature detecting portion provided with a bolometer thin film;
a supporting portion arranged on said substrate and supporting said temperature detecting portion so that one face of said temperature detecting portion and said substrate are opposed to each other with a predetermined gap;
a dielectric member opposed to the other face of said temperature detecting portion with a predetermined gap;
electrode wiring connecting the read-out integrated circuit and the bolometer thin film;
an absorbing film constituting said temperature detecting portion and absorbing said THz wave;
a reflective film formed on a face of said substrate opposed to the temperature detecting portion and reflecting said THz wave and forming an optical resonance structure together with said temperature detecting portion; and
an optical film having a predetermined refractive index transmitting said THz wave between said reflective film and said temperature detecting portion,
wherein a gap between said reflective film and said temperature detecting portion is set on the basis of a wavelength of an infrared ray and sheet resistance of said temperature detecting portion is set on the basis of said THz wave.

9. The bolometer-type THz-wave detector according to claim 8, wherein said optical film comprises any one of a silicon oxide film, a silicon nitride film, a silicon oxynitride film or a silicon film.

* * * * *